United States Patent
Qian et al.

(10) Patent No.: US 12,175,188 B2
(45) Date of Patent: Dec. 24, 2024

(54) SENTENCE PARAPHRASE METHOD AND APPARATUS, AND METHOD AND APPARATUS FOR TRAINING SENTENCE PARAPHRASE MODEL

(71) Applicant: HUAWEI TECHNOLOGIES CO., LTD., Guangdong (CN)

(72) Inventors: Lihua Qian, Shanghai (CN); Yinpeng Guo, Hong Kong (CN); Lin Qiu, Shanghai (CN); Weinan Zhang, Shanghai (CN); Xin Jiang, Hong Kong (CN); Yong Yu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 309 days.

(21) Appl. No.: 17/701,775

(22) Filed: Mar. 23, 2022

(65) Prior Publication Data
US 2022/0215159 A1   Jul. 7, 2022

Related U.S. Application Data

(63) Continuation of application No. PCT/CN2020/117633, filed on Sep. 25, 2020.

(30) Foreign Application Priority Data

Sep. 27, 2019   (CN) .......................... 201910925762.5

(51) Int. Cl.
*G06F 40/40* (2020.01)
*G06F 40/166* (2020.01)
(Continued)

(52) U.S. Cl.
CPC ............ *G06F 40/166* (2020.01); *G06F 40/20* (2020.01); *G06F 40/40* (2020.01); *G06F 40/30* (2020.01)

(58) Field of Classification Search
None
See application file for complete search history.

(56) References Cited

U.S. PATENT DOCUMENTS

2008/0154853 A1   6/2008   Deshpande et al.
2017/0337478 A1   11/2017  Sarikaya et al.
(Continued)

FOREIGN PATENT DOCUMENTS

CN   106156848 A   11/2016
CN   107092664 A   8/2017
(Continued)

OTHER PUBLICATIONS

Mu-Chun Su et al, A Reinforcement-Learning Approach to Robot Navigation, Proceedings of the 2004 IEEE, Taipei, Taiwan, Mar. 21-23, 2004, International Conference on Networidng, Sensing and Control, total 5 pages.
(Continued)

Primary Examiner — Nafiz E Hoque

(57) ABSTRACT

This disclosure relates to a natural language processing technology, and provides a sentence paraphrase method and apparatus. The method includes: paraphrasing an input sentence by using a sentence paraphrase model, to generate a plurality of candidate paraphrased sentences; and determining a similarity between each of the plurality of candidate paraphrased sentences and the input sentence, to obtain an output sentence whose similarity to the input sentence is greater than or equal to a preset threshold, where each of a plurality of paraphrased sentence generators in the sentence paraphrase model includes one neural network, the plurality of paraphrased sentence generators are trained by using source information and similarity information as a first reward, and the paraphrased sentence is obtained by paraphrasing the training sentence by using the plurality of paraphrased sentence generators. In the sentence paraphrase
(Continued)

method, diversity of a paraphrased sentence and quality of the paraphrased sentence can be improved.

20 Claims, 13 Drawing Sheets

(51) Int. Cl.
*G06F 40/20* (2020.01)
*G06F 40/30* (2020.01)

(56) References Cited

U.S. PATENT DOCUMENTS

| | | | |
|---|---|---|---|
| 2018/0121419 A1* | 5/2018 | Lee | G06F 40/56 |
| 2019/0147355 A1 | 5/2019 | Rennie et al. | |
| 2020/0250377 A1* | 8/2020 | Jiang | G06F 40/289 |

FOREIGN PATENT DOCUMENTS

| | | | | |
|---|---|---|---|---|
| CN | 108133705 A | | 6/2018 | |
| CN | 108520298 A | | 9/2018 | |
| CN | 108874972 A | | 11/2018 | |
| CN | 109710915 A | | 5/2019 | |
| CN | 109710915 B | * | 2/2021 | G06F 17/27 |

OTHER PUBLICATIONS

Shiqi Zhao et al, Application-driven Statistical Paraphrase Generation, Proceedings of the 47th Annual Meeting of the ACL and the 4th IJCNLP of the AFNLP, Suntec, Singapore, Aug. 2-7, 2009, total 9 pages.

Zhang Mengyang et al, Method for service plans generation based on reinforcement learning, J. Huazhong Univ. of Sci. and Tech. (Natural Science Edition), vol. 46 No. 9, Sep. 2018, with the English Abstract, total 5 pages.

Aaditya Prakash et al, Neural Paraphrase Generation with Stacked Residual LSTM Networks, Proceedings of COLING 2016, the 26th International Conference on Computational Linguistics: Technical Papers, Osaka, Japan, Dec. 11-17, 2016, total 12 pages.

Ziqiang Cao et al, Joint Copying and Restricted Generation for Paraphrase, Association for the Advancement of ArtificialIntelligence, 2017, total 7 pages.

Marc Aurelio Ranzato et al, Sequence Level Training With Recurrent Neural Networks, Published as a conference paper at ICLR 2016, total 16 pages.

Abigail See et al, Get to The Point: Summarization with Pointer-Generator Networks, arXiv:1704.04368, Apr. 25, 2017, total 20 pages.

Jiwei Li et al, A Simple, Fast Diverse Decoding Algorithm for Neural Generation, arXiv:1611.08562v2 [cs.CL] Dec. 22, 2016, total 11 pages.

Bo Dai et al, Towards Diverse and Natural Image Descriptions via a Conditional GAN, arXiv:1703.06029, Aug. 11, 2017, total 10 pages.

Ronald J. Williams, Simple Statistical Gradient-Following Algorithms for Connectionist Reinforcement Learning, Machine Learning, 8, 229-256 (1992), 1992 Kluwer Academic Publishers, Boston. Manufactured in The Netherlands. total 28 pages.

* cited by examiner

SENTENCE PARAPHRASE METHOD AND APPARATUS, AND METHOD AND APPARATUS FOR TRAINING SENTENCE PARAPHRASE MODEL

CROSS-REFERENCE TO RELATED APPLICATIONS

This application is a continuation of International Application No. PCT/CN2020/117633, filed on Sep. 25, 2020, which claims priority to Chinese Patent Application No. 201910925762.5, filed on Sep. 27, 2019. The disclosures of the aforementioned applications are hereby incorporated by reference in their entireties.

TECHNICAL FIELD

This disclosure relates to the artificial intelligence field, and more specifically, to a sentence paraphrase method and apparatus, and a method and an apparatus for training a sentence paraphrase model.

BACKGROUND

Artificial intelligence (AI) is a theory, a method, a technology, and an application system that simulate, extend, and expand human intelligence by using a digital computer or a machine controlled by a digital computer, sense the environment, obtain knowledge, and use the knowledge to obtain a best result. In other words, artificial intelligence is a branch of computer science, and is intended to understand the essence of intelligence and produce a new intelligent machine that can react in a manner similar to human intelligence. Artificial intelligence is to study design principles and implementation methods of various intelligent machines, so that the machines have perceiving, inference, and decision-making functions.

With continuous development of artificial intelligence technologies, a natural language human-machine interaction system that enables human-machine interaction to be performed by using a natural language becomes increasingly important. The system needs to recognize specific meanings of a human natural language, to enable the human-machine interaction to be performed by using the natural language. Usually, the system extracts key information from a natural language sentence to recognize a specific meaning of the sentence.

A paraphrase is a different expression having same semantics as a sentence. The paraphrase is very common in a natural language, and the paraphrase is also increasingly widely used in the field of natural language processing (NLP). Therefore, how to improve diversity of a paraphrased sentence and quality of the paraphrased sentence becomes a technical problem that needs to be resolved urgently.

SUMMARY

This disclosure provides a sentence paraphrase method and apparatus, and a method and an apparatus for training a sentence paraphrase model, to improve diversity of a paraphrased sentence and quality of the paraphrased sentence.

According to a first aspect, a sentence paraphrase method is provided, where the method includes: obtaining an input sentence; paraphrasing the input sentence by using a sentence paraphrase model, to generate a plurality of candidate paraphrased sentences; and determining a similarity between each of the plurality of candidate paraphrased sentences and the input sentence, to obtain an output sentence whose similarity to the input sentence is greater than or equal to a preset threshold, where the sentence paraphrase model includes a plurality of preset paraphrased sentence generators, each of the plurality of paraphrased sentence generators includes one neural network, one or more of the plurality of paraphrased sentence generators are trained by using a reinforcement learning method and by using source information and similarity information as a first reward, the source information is used to indicate a probability that each of the plurality of paraphrased sentence generators generates a paraphrased sentence of a training sentence, the similarity information is used to indicate a similarity between the paraphrased sentence and the training sentence, and the paraphrased sentence is obtained by paraphrasing the training sentence by using the plurality of paraphrased sentence generators.

In this embodiment of this disclosure, the one or more of the plurality of paraphrased sentence generators are trained by using the source information and the similarity information as the reward, the source information is used to indicate the probability that each paraphrased sentence generator generates the paraphrased sentence of the training sentence, and the similarity information is used to indicate the similarity between the paraphrased sentence and the training sentence. In the sentence paraphrase model trained by using the method, both quality of the paraphrased sentence and diversity of the paraphrased sentence may be considered. Therefore, diversity of the paraphrased sentence and quality of the paraphrased sentence can be improved.

Further, the sentence paraphrase model in this embodiment of this disclosure includes a plurality of paraphrased sentence generators, and each paraphrased sentence generator thereof may generate a high-quality paraphrased sentence. Therefore, the plurality of paraphrased sentence generators in the sentence paraphrase model may be flexibly applied to fields such as machine translation, automatic question answering system, and information retrieval.

Optionally, the training sentence (or the input sentence) may be a word, a phrase, or a sentence. In addition, the training sentence may also be in various languages. This is not limited in this embodiment of this disclosure.

Optionally, the paraphrased sentence may be a word, a phrase, or a sentence. In addition, the paraphrased sentence may also be in various languages. This is not limited in this embodiment of this disclosure.

With reference to the first aspect, in some implementations of the first aspect, each of the plurality of paraphrased sentence generators is trained by using, as the first reward, the similarity information and the probability that each paraphrased sentence generator generates the paraphrased sentence.

In this embodiment of this disclosure, the similarity information and the probability that each of the plurality of paraphrased sentence generators generates the paraphrased sentence are used as the reward to train the paraphrased sentence generator, so that the paraphrased sentence generator can ensure diversity of the paraphrased sentence while ensuring quality of the paraphrased sentence. Therefore, diversity of the paraphrased sentence and quality of the paraphrased sentence can be improved.

With reference to the first aspect, in some implementations of the first aspect, for a first paraphrased sentence generator, a second reward of the first paraphrased sentence generator is greater than a first reward of the first paraphrased sentence generator, where the second reward of the first paraphrased sentence generator is obtained based on a paraphrased sentence generated through paraphrasing by the first paraphrased sentence generator whose parameter is adjusted, the first paraphrased sentence generator is a paraphrased sentence generator having a highest probability of generating the paraphrased sentence in the plurality of paraphrased sentence generators, and the parameter of the first paraphrased sentence generator is adjusted based on the first reward of the first paraphrased sentence generator; and for a paraphrased sentence generator other than the first paraphrased sentence generator in the plurality of paraphrased sentence generators, a second reward of the another paraphrased sentence generator is less than a first reward of the another paraphrased sentence generator, where the second reward of the another paraphrased sentence generator is obtained based on the paraphrased sentence generated through paraphrasing by the first paraphrased sentence generator whose parameter is adjusted, and a parameter of the another paraphrased sentence generator is adjusted based on the first reward of the another paraphrased sentence generator.

With reference to the first aspect, in some implementations of the first aspect, the sentence paraphrase model further includes a preset similarity discriminator, the similarity discriminator includes a second neural network, and the similarity information is determined by using the similarity discriminator.

In this embodiment of this disclosure, the similarity discriminator (including the second neural network) is used to determine the similarity information, so that accuracy of the similarity information can be improved.

With reference to the first aspect, in some implementations of the first aspect, the source information is determined by using a preset source discriminator, and the source discriminator includes a third neural network.

In this embodiment of this disclosure, the source discriminator (including the third neural network) is used to determine the source information, so that accuracy of the source information can be improved.

Optionally, in a process of training the paraphrased sentence generator, a number of a paraphrased sentence generator that generates the paraphrased sentence may be used as a label of the paraphrased sentence, to train the source discriminator.

It may be learned that a training process of the source discriminator is supervised training.

According to a second aspect, a method for training a sentence paraphrase model is provided, where the sentence paraphrase model includes a plurality of preset paraphrased sentence generators, each of the plurality of paraphrased sentence generators includes one neural network, and the method includes: obtaining a training sentence; paraphrasing the training sentence by using the plurality of paraphrased sentence generators, to generate a paraphrased sentence; determining source information of the paraphrased sentence, where the source information is used to indicate a probability that each of the plurality of paraphrased sentence generators generates the paraphrased sentence; determining similarity information between the paraphrased sentence and the training sentence, where the similarity information is used to indicate a similarity between the paraphrased sentence and the training sentence; and adjusting parameters of one or more of the plurality of paraphrased sentence generators by using a reinforcement learning method and by using the source information and the similarity information as a first reward.

In this embodiment of this disclosure, the one or more of the plurality of paraphrased sentence generators are trained by using the source information and the similarity information as the reward, the source information is used to indicate the probability that each paraphrased sentence generator generates the paraphrased sentence of the training sentence, and the similarity information is used to indicate the similarity between the paraphrased sentence and the training sentence. In the sentence paraphrase model trained by using the method, both quality of the paraphrased sentence and diversity of the paraphrased sentence may be considered. Therefore, diversity of the paraphrased sentence and quality of the paraphrased sentence can be improved.

Further, the sentence paraphrase model in this embodiment of this disclosure includes a plurality of paraphrased sentence generators, and each paraphrased sentence generator thereof may generate a high-quality paraphrased sentence. Therefore, the plurality of paraphrased sentence generators in the sentence paraphrase model may be flexibly applied to fields such as machine translation, automatic question answering system, and information retrieval.

Optionally, the training sentence (or the input sentence) may be a word, a phrase, or a sentence. In addition, the training sentence may also be in various languages. This is not limited in this embodiment of this disclosure.

Optionally, the paraphrased sentence may be a word, a phrase, or a sentence. In addition, the paraphrased sentence may also be in various languages. This is not limited in this embodiment of this disclosure.

With reference to the second aspect, in some implementations of the second aspect, the adjusting parameters of the plurality of paraphrased sentence generators by using the source information and the similarity information as a first reward includes: adjusting a parameter of each paraphrased sentence generator by using, as a first reward of each paraphrased sentence generator, the similarity information and the probability that each of the plurality of paraphrased sentence generators generates the paraphrased sentence.

In this embodiment of this disclosure, the similarity information and the probability that each paraphrased sentence generator generates the paraphrased sentence are used as the reward to train the paraphrased sentence generator, so that the paraphrased sentence generator can ensure diversity of the paraphrased sentence while ensuring quality of the paraphrased sentence. Therefore, diversity of the paraphrased sentence and quality of the paraphrased sentence can be improved.

With reference to the second aspect, in some implementations of the second aspect, the adjusting a parameter of each paraphrased sentence generator by using, as a first reward of each paraphrased sentence generator, the similarity information and the probability that each of the plurality of paraphrased sentence generators generates the paraphrased sentence includes: adjusting a parameter of a first paraphrased sentence generator, so that a second reward of the first paraphrased sentence generator is greater than a first reward of the first paraphrased sentence generator, where the second reward of the first paraphrased sentence generator is obtained based on a paraphrased sentence generated through paraphrasing by the first paraphrased sentence generator whose parameter is adjusted, and the first paraphrased sentence generator is a paraphrased sentence generator having a highest probability of generating the paraphrased sentence in the plurality of paraphrased sentence generators; and adjusting a parameter of a paraphrased sentence generator other than the first paraphrased sentence generator in the plurality of paraphrased sentence generators, so that a second reward of the another paraphrased sentence generator is less than a first reward of the another paraphrased sentence generator, where the second reward of the another paraphrased sentence generator is obtained based on the paraphrased sentence generated through paraphrasing by the first paraphrased sentence generator whose parameter is adjusted.

With reference to the second aspect, in some implementations of the second aspect, the sentence paraphrase model further includes a preset similarity discriminator, and the similarity discriminator includes a second neural network; and the determining similarity information between the paraphrased sentence and the training sentence includes: determining the similarity information between the paraphrased sentence and the training sentence by using the similarity discriminator.

In this embodiment of this disclosure, the similarity discriminator (including the second neural network) is used to determine the similarity information, so that accuracy of the similarity information can be improved.

With reference to the second aspect, in some implementations of the second aspect, the determining source information of the paraphrased sentence includes: determining the source information of the paraphrased sentence by using a preset source discriminator, where the source discriminator includes a third neural network.

In this embodiment of this disclosure, the source discriminator (including the third neural network) is used to determine the source information, so that accuracy of the source information can be improved.

Optionally, in a process of training the paraphrased sentence generator, a number of a paraphrased sentence generator that generates the paraphrased sentence may be used as a label of the paraphrased sentence, to train the source discriminator.

It may be learned that a training process of the source discriminator is supervised training.

According to a third aspect, a sentence paraphrase apparatus is provided, including: an obtaining module, configured to obtain an input sentence; a paraphrase module, configured to paraphrase the input sentence by using a sentence paraphrase model, to generate a plurality of candidate paraphrased sentences; and a determining module, configured to determine a similarity between each of the plurality of candidate paraphrased sentences and the input sentence, to obtain an output sentence whose similarity to the input sentence is greater than or equal to a preset threshold, where the sentence paraphrase model includes a plurality of preset paraphrased sentence generators, each of the plurality of paraphrased sentence generators includes one neural network, one or more of the plurality of paraphrased sentence generators are trained by using a reinforcement learning method and by using source information and similarity information as a first reward, the source information is used to indicate a probability that each of the plurality of paraphrased sentence generators generates a paraphrased sentence of a training sentence, the similarity information is used to indicate a similarity between the paraphrased sentence and the training sentence, and the paraphrased sentence is obtained by paraphrasing the training sentence by using the plurality of paraphrased sentence generators.

In this embodiment of this disclosure, the one or more of the plurality of paraphrased sentence generators are trained by using the source information and the similarity information as the reward, the source information is used to indicate the probability that each paraphrased sentence generator generates the paraphrased sentence of the training sentence, and the similarity information is used to indicate the similarity between the paraphrased sentence and the training sentence. In the sentence paraphrase model trained by using the method, both quality of the paraphrased sentence and diversity of the paraphrased sentence may be considered. Therefore, diversity of the paraphrased sentence and quality of the paraphrased sentence can be improved.

Further, the sentence paraphrase model in this embodiment of this disclosure includes a plurality of paraphrased sentence generators, and each paraphrased sentence generator thereof may generate a high-quality paraphrased sentence. Therefore, the plurality of paraphrased sentence generators in the sentence paraphrase model may be flexibly applied to fields such as machine translation, automatic question answering system, and information retrieval.

Optionally, the training sentence (or the input sentence) may be a word, a phrase, or a sentence. In addition, the training sentence may also be in various languages. This is not limited in this embodiment of this disclosure.

Optionally, the paraphrased sentence may be a word, a phrase, or a sentence. In addition, the paraphrased sentence may also be in various languages. This is not limited in this embodiment of this disclosure.

With reference to the third aspect, in some implementations of the third aspect, each of the plurality of paraphrased sentence generators is trained by using, as the first reward, the similarity information and the probability that each paraphrased sentence generator generates the paraphrased sentence.

In this embodiment of this disclosure, the similarity information and the probability that each paraphrased sentence generator generates the paraphrased sentence are used as the reward to train the paraphrased sentence generator, so that the paraphrased sentence generator can ensure diversity of the paraphrased sentence while ensuring quality of the paraphrased sentence. Therefore, diversity of the paraphrased sentence and quality of the paraphrased sentence can be improved.

With reference to the third aspect, in some implementations of the third aspect, for a first paraphrased sentence generator, a second reward of the first paraphrased sentence generator is greater than a first reward of the first paraphrased sentence generator, where the second reward of the first paraphrased sentence generator is obtained based on a paraphrased sentence generated through paraphrasing by the first paraphrased sentence generator whose parameter is adjusted, the first paraphrased sentence generator is a paraphrased sentence generator having a highest probability of generating the paraphrased sentence in the plurality of paraphrased sentence generators, and the parameter of the first paraphrased sentence generator is adjusted based on the first reward of the first paraphrased sentence generator; and for a paraphrased sentence generator other than the first paraphrased sentence generator in the plurality of paraphrased sentence generators, a second reward of the another paraphrased sentence generator is less than a first reward of the another paraphrased sentence generator, where the second reward of the another paraphrased sentence generator is obtained based on the paraphrased sentence generated through paraphrasing by the first paraphrased sentence generator whose parameter is adjusted, and a parameter of the another paraphrased sentence generator is adjusted based on the first reward of the another paraphrased sentence generator.

With reference to the third aspect, in some implementations of the third aspect, the sentence paraphrase apparatus further includes a preset similarity discriminator, the similarity discriminator includes a second neural network, and the similarity information is determined by using the similarity discriminator.

In this embodiment of this disclosure, the similarity discriminator (including the second neural network) is used to determine the similarity information, so that accuracy of the similarity information can be improved.

With reference to the third aspect, in some implementations of the third aspect, the source information is determined by using a preset source discriminator, and the source discriminator includes a third neural network.

In this embodiment of this disclosure, the source discriminator (including the third neural network) is used to determine the source information, so that accuracy of the source information can be improved.

Optionally, in a process of training the paraphrased sentence generator, a number of a paraphrased sentence generator that generates the paraphrased sentence may be used as a label of the paraphrased sentence, to train the source discriminator.

It may be learned that a training process of the source discriminator is supervised training.

According to a fourth aspect, an apparatus for training a sentence paraphrase model is provided, where the sentence paraphrase model includes a plurality of preset paraphrased sentence generators, each of the plurality of paraphrased sentence generators includes one neural network, and the apparatus includes: an obtaining module, configured to obtain a training sentence; a paraphrase module, configured to paraphrase the training sentence by using the plurality of paraphrased sentence generators, to generate a paraphrased sentence; a source discrimination module, configured to determine source information of the paraphrased sentence, where the source information is used to indicate a probability that each of the plurality of paraphrased sentence generators generates the paraphrased sentence; a similarity discrimination module, configured to determine similarity information between the paraphrased sentence and the training sentence, where the similarity information is used to indicate a similarity between the paraphrased sentence and the training sentence; and an adjustment module, configured to adjust parameters of one or more of the plurality of paraphrased sentence generators by using a reinforcement learning method and by using the source information and the similarity information as a first reward.

In this embodiment of this disclosure, the one or more of the plurality of paraphrased sentence generators are trained by using the source information and the similarity information as the reward, the source information is used to indicate the probability that each paraphrased sentence generator generates the paraphrased sentence of the training sentence, and the similarity information is used to indicate the similarity between the paraphrased sentence and the training sentence. In the sentence paraphrase model trained by using the method, both quality of the paraphrased sentence and diversity of the paraphrased sentence may be considered. Therefore, diversity of the paraphrased sentence and quality of the paraphrased sentence can be improved.

Further, the sentence paraphrase model in this embodiment of this disclosure includes a plurality of paraphrased sentence generators, and each paraphrased sentence generator thereof may generate a high-quality paraphrased sentence. Therefore, the plurality of paraphrased sentence generators in the sentence paraphrase model may be flexibly applied to fields such as machine translation, automatic question answering system, and information retrieval.

Optionally, the training sentence (or the input sentence) may be a word, a phrase, or a sentence. In addition, the training sentence may also be in various languages. This is not limited in this embodiment of this disclosure.

Optionally, the paraphrased sentence may be a word, a phrase, or a sentence. In addition, the paraphrased sentence may also be in various languages. This is not limited in this embodiment of this disclosure.

With reference to the fourth aspect, in some implementations of the fourth aspect, the adjustment module is specifically configured to: for each of the plurality of paraphrased sentence generators, adjust a parameter of each paraphrased sentence generator by using, as a first reward of each paraphrased sentence generator, the similarity information and the probability that each of the plurality of paraphrased sentence generators generates the paraphrased sentence.

In this embodiment of this disclosure, the similarity information and the probability that each paraphrased sentence generator generates the paraphrased sentence are used as the reward to train the paraphrased sentence generator, so that the paraphrased sentence generator can ensure diversity of the paraphrased sentence while ensuring quality of the paraphrased sentence. Therefore, diversity of the paraphrased sentence and quality of the paraphrased sentence can be improved.

With reference to the fourth aspect, in some implementations of the fourth aspect, the adjustment module is specifically configured to: adjust a parameter of a first paraphrased sentence generator, so that a second reward of the first paraphrased sentence generator is greater than a first reward of the first paraphrased sentence generator, where the second reward of the first paraphrased sentence generator is obtained based on a paraphrased sentence generated through paraphrasing by the first paraphrased sentence generator whose parameter is adjusted, and the first paraphrased sentence generator is a paraphrased sentence generator having a highest probability of generating the paraphrased sentence in the plurality of paraphrased sentence generators; and adjust a parameter of a paraphrased sentence generator other than the first paraphrased sentence generator in the plurality of paraphrased sentence generators, so that a second reward of the another paraphrased sentence generator is less than a first reward of the another paraphrased sentence generator, where the second reward of the another paraphrased sentence generator is obtained based on the paraphrased sentence generated through paraphrasing by the first paraphrased sentence generator whose parameter is adjusted.

With reference to the fourth aspect, in some implementations of the fourth aspect, the sentence paraphrase model further includes a preset similarity discriminator, and the similarity discriminator includes a second neural network; and the determining similarity information between the paraphrased sentence and the training sentence includes: determining the similarity information between the paraphrased sentence and the training sentence by using the similarity discriminator.

In this embodiment of this disclosure, the similarity discriminator (including the second neural network) is used to determine the similarity information, so that accuracy of the similarity information can be improved.

With reference to the fourth aspect, in some implementations of the fourth aspect, the source discrimination module further includes a preset source discriminator, and the source discriminator is specifically configured to determine the source information of the paraphrased sentence by using the source discriminator, where the source discriminator includes a third neural network.

In this embodiment of this disclosure, the source discriminator (including the third neural network) is used to determine the source information, so that accuracy of the source information can be improved.

Optionally, in a process of training the paraphrased sentence generator, a number of a paraphrased sentence generator that generates the paraphrased sentence may be used as a label of the paraphrased sentence, to train the source discriminator.

It may be learned that a training process of the source discriminator is supervised training.

According to a fifth aspect, a sentence paraphrase apparatus is provided. The apparatus includes: a memory, configured to store a program; and a processor, configured to execute the program stored in the memory. When the program stored in the memory is executed, the processor is configured to perform the method in any one of the implementations of the first aspect.

According to a sixth aspect, an apparatus for training a sentence paraphrase model is provided. The apparatus includes: a memory, configured to store a program; and a processor, configured to execute the program stored in the memory. When the program stored in the memory is executed, the processor is configured to perform the method in any one of the implementations of the second aspect.

The processor in the fifth aspect and the sixth aspect may be a central processing unit (CPU), or may be a combination of a CPU and a neural network operation processor. The neural network operation processor herein may include a graphics processing unit (GPU), a neural processing unit (NPU), a tensor processing unit (TPU), and the like. The TPU is an artificial intelligence accelerator-specific integrated circuit customized by Google for machine learning.

According to a seventh aspect, a computer-readable medium is provided. The computer-readable medium stores program code to be executed by a device, and the program code is used to perform the method in any one of the implementations of the first aspect or the second aspect.

According to an eighth aspect, a computer program product including instructions is provided. When the computer program product runs on a computer, the computer is enabled to perform the method in any one of the implementations of the first aspect or the second aspect.

According to a ninth aspect, a chip is provided. The chip includes a processor and a data interface. The processor performs the method in any one of the implementations of the first aspect or the second aspect by reading, through the data interface, instructions stored in a memory.

Optionally, in an implementation, the chip may further include the memory, and the memory stores the instructions. The processor is configured to execute the instructions stored in the memory, and when the instructions are executed, the processor is configured to perform the method in any one of the implementations of the first aspect or the second aspect.

The foregoing chip may be specifically a field-programmable gate array (FPGA) or an application-specific integrated circuit (ASIC).

According to a tenth aspect, an electronic device is provided, where the electronic device includes the sentence paraphrase apparatus in any one of the implementations of the third aspect, or the electronic device includes the apparatus for training a sentence paraphrase model in any one of the aspects of the fourth aspect.

When the electronic device includes the sentence paraphrase apparatus in any one of the aspects of the third aspect, the electronic device may be specifically a terminal device.

When the electronic device includes the apparatus for training a sentence paraphrase apparatus in any one of the aspects of the fourth aspect, the electronic device may be specifically a server.

In the embodiments of this disclosure, the one or more of the plurality of paraphrased sentence generators are trained by using the source information and the similarity information as the reward, the source information is used to indicate the probability that each paraphrased sentence generator generates the paraphrased sentence of the training sentence, and the similarity information is used to indicate the similarity between the paraphrased sentence and the training sentence. In the sentence paraphrase model trained by using the method, both quality of the paraphrased sentence and diversity of the paraphrased sentence may be considered. Therefore, diversity of the paraphrased sentence and quality of the paraphrased sentence can be improved.

DESCRIPTION OF EMBODIMENTS

The following describes technical solutions in this disclosure with reference to the accompanying drawings.

Figure 1:
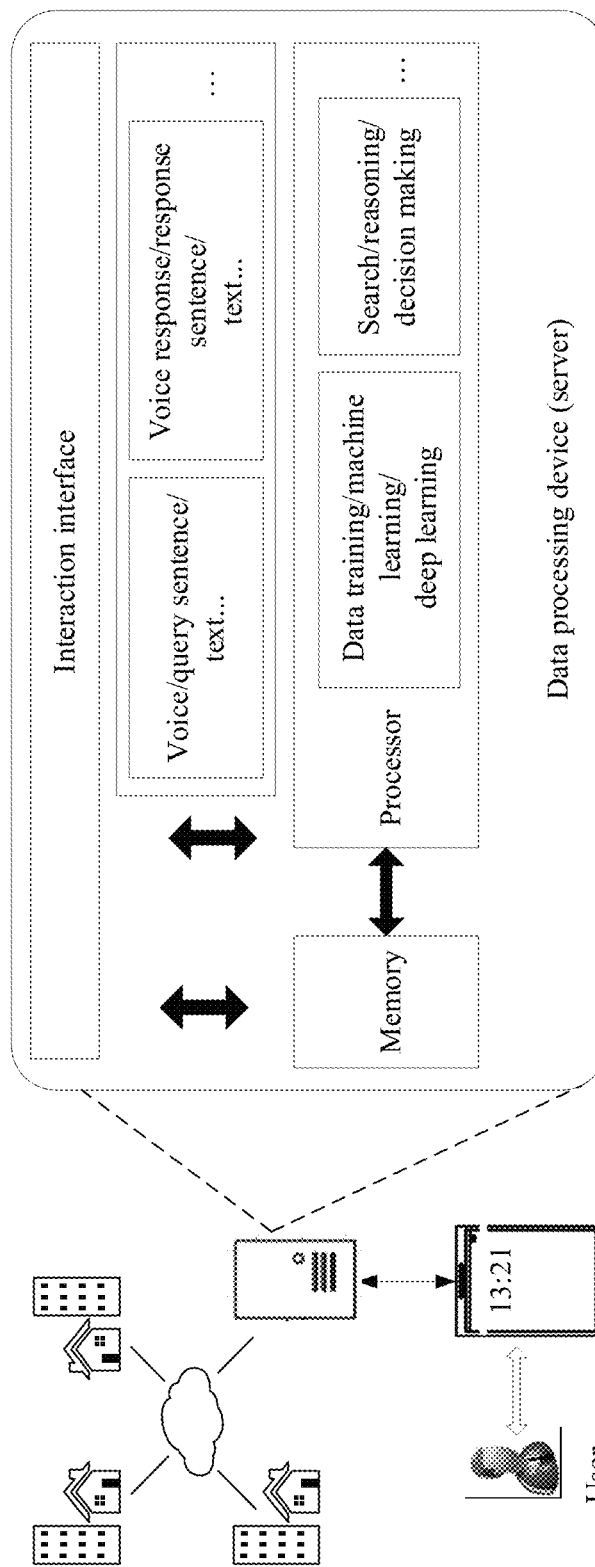
FIG. 1 is a schematic diagram of an application scenario of natural language processing according to an embodiment of this disclosure.
Figure 2:
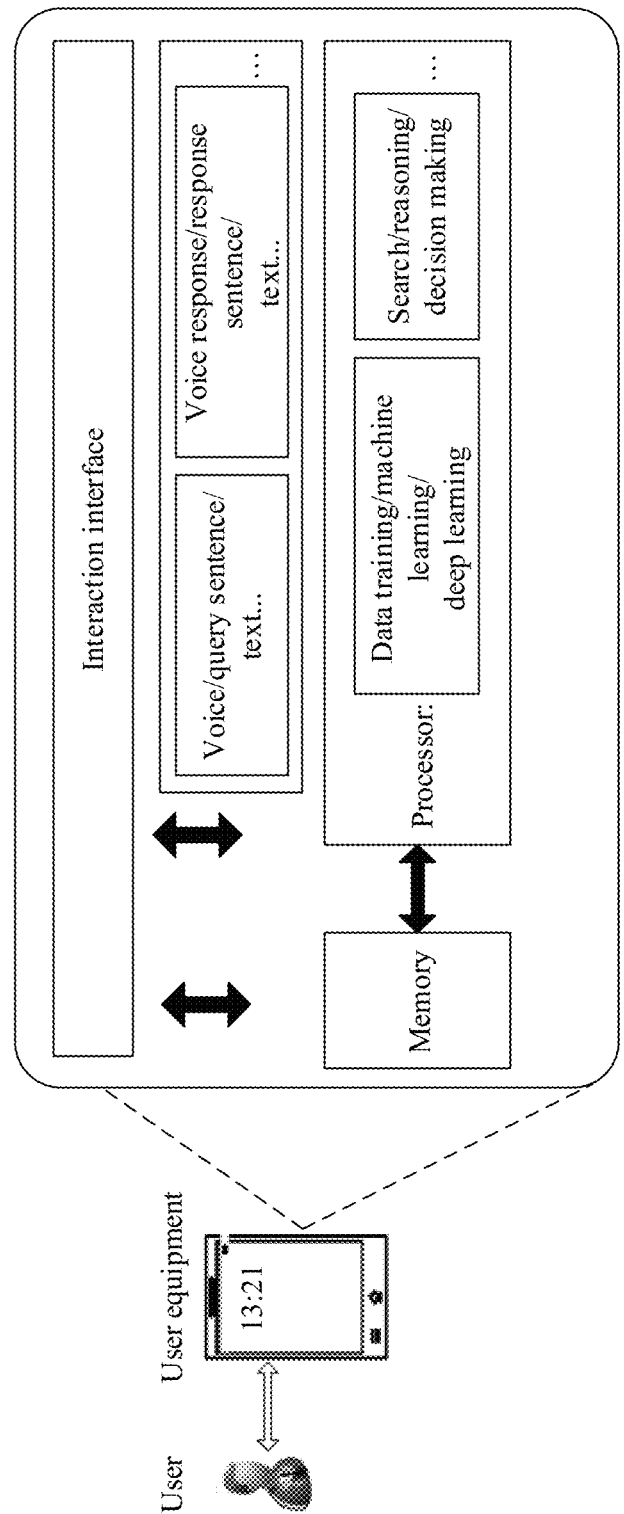
FIG. 2 is a schematic diagram of another application scenario of natural language processing according to an embodiment of this disclosure.
Figure 3:
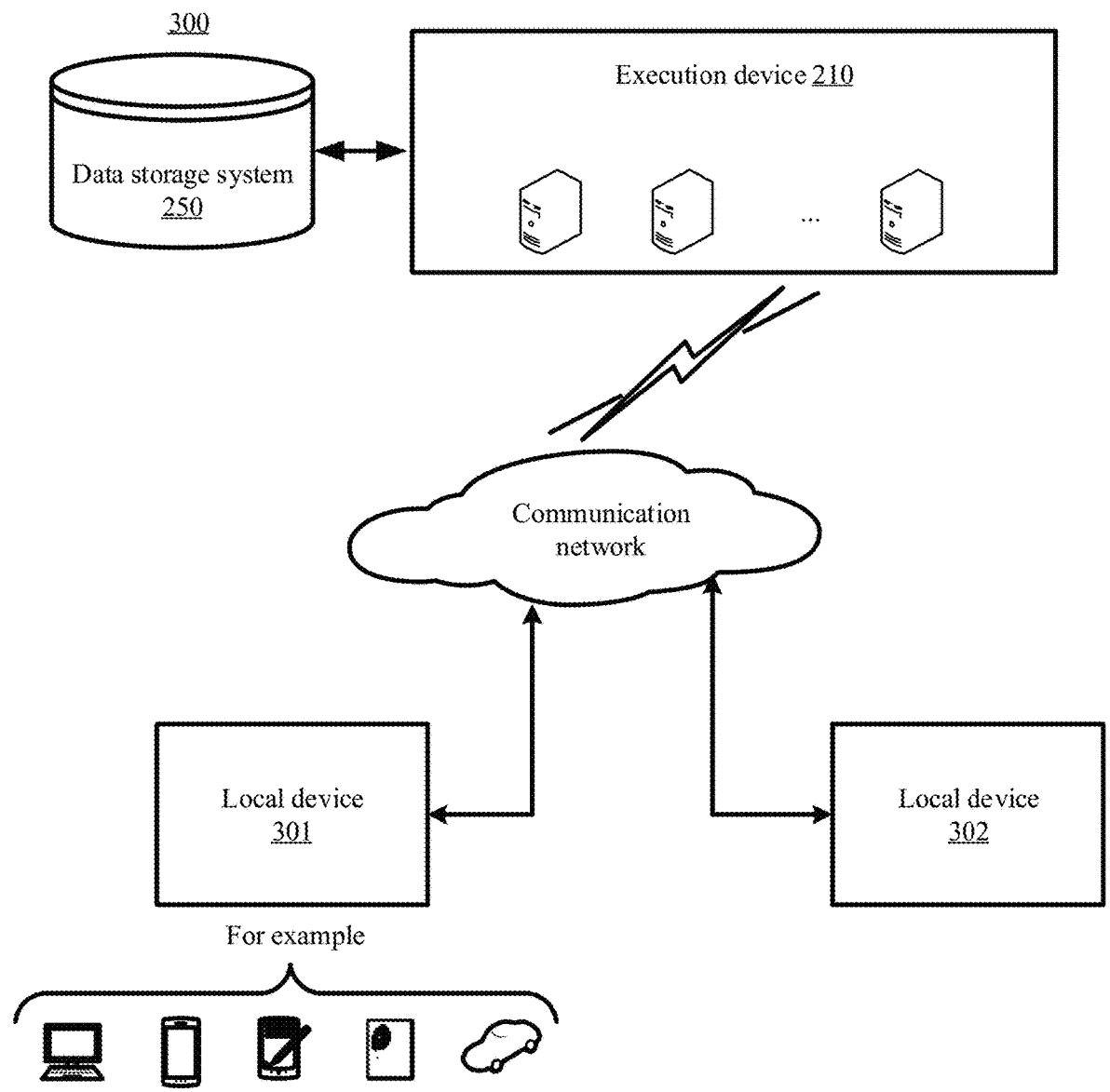
FIG. 3 is a schematic diagram of a device related to natural language processing according to an embodiment of this disclosure.

To better understand the solutions in embodiments of this disclosure, the following briefly describes a possible application scenario in the embodiments of this disclosure with reference to FIG. 1 to FIG. 3.

FIG. 1 shows a natural language processing system. The natural language processing system includes user equipment and a data processing device. The user equipment includes an intelligent terminal such as a mobile phone, a personal computer, or an information processing center. The user equipment is an initiating end of natural language data processing. As an initiator of a request for language questioning and answering, querying, or the like, a user usually initiates the request by using the user equipment.

The data processing device may be a device or a server having a data processing function, such as a cloud server, a network server, an application server, or a management server.

The data processing device receives, through an interaction interface, a question such as a query statement/voice/text from the intelligent terminal, and then performs, by using a memory storing data and a processor processing data, language data processing in a manner of machine learning, deep learning, searching, inference, decision-making, or the like. The memory in the data processing device may be a general name, including a local storage and a database storing historical data. The database may be in the data processing device, or may be in another network server.

In the natural language processing system shown in FIG. 1, the user equipment may receive an instruction of the user, to request to paraphrase an input sentence (for example, the input sentence may be a sentence that is input by the user) to obtain a paraphrased sentence (for example, the paraphrased sentence may be a different expression that is obtained through paraphrasing and that has same semantics as the input sentence), and then send the input sentence to the data processing device, so that the data processing device paraphrases the input sentence to obtain the paraphrased sentence.

In FIG. 1, the data processing device may perform a text processing method according to an embodiment of this disclosure.

A paraphrase is a different expression having same semantics as an input sentence. For example, if the input sentence is "What is the distance from the sun to the earth", the input sentence may be paraphrased to obtain paraphrased sentences such as "How far is the sun from the earth", "How many kilometers is it from the earth to the sun", "How many kilometers is the earth from the sun". These paraphrased sentences all express same or similar semantics as the input sentence, namely, "What is the distance between the sun and the earth". Therefore, it may also be understood that these sentences are paraphrases of each other.

In this embodiment of this disclosure, the paraphrase may include different levels of paraphrases, such as a word level, a phrase level, and a sentence level, that is, the input sentence and the paraphrased sentence each may be a word, a phrase, or a sentence. This is not limited in this embodiment of this disclosure.

For example, the word level of paraphrase is commonly referred to as a synonym. For example, the word level of paraphrase may include "fanqie" and "xihongshi", and "car" and "vehicle".

For example, the phrase level of paraphrase may include "Beijing daxue" and "Beida", and "consider" and "take . . . into consideration".

For example, the sentence level of paraphrase may include: "Yao Ming de shengao shi duoshao?" and "Yao Ming you duo gao?", and "Messi plays for FC Barcelona in the Spanish Primera League." and "Messi is a player of *Barca* in La Liga.".

It should be noted that a language of the input sentence is not limited in this embodiment of this disclosure, and the input sentence and the paraphrased sentence may be in various languages such as Chinese, English, German, and French. This is not limited in this embodiment of this disclosure.

In addition, in this embodiment of this disclosure, the language of the input sentence and a language of the paraphrased sentence may be the same. For example, both the input sentence and the paraphrased sentence are in Chinese. Alternatively, the language of the input sentence and a language of the paraphrased sentence may be different. For example, the input sentence is in Chinese, and the paraphrased sentence is in English. This is not limited in this embodiment of this disclosure.

FIG. 2 shows another natural language processing system. In FIG. 2, user equipment is directly used as a data processing device. The user equipment can directly receive an input from a user, and the input is directly processed by using hardware of the user equipment. A specific process is similar to that in FIG. 1. For details, refer to the foregoing description. Details are not described herein again.

In the natural language processing system shown in FIG. 2, the user equipment may receive an instruction of the user, and the user equipment paraphrases an input sentence to obtain a paraphrased sentence.

In FIG. 2, the user equipment may perform a sentence paraphrase method according to an embodiment of this disclosure.

FIG. 3 is a schematic diagram of a device related to natural language processing according to an embodiment of this disclosure.

The user equipment in FIG. 1 and FIG. 2 may be specifically a local device 301 or a local device 302 in FIG. 3, and the data processing device in FIG. 1 may be specifically an execution device 210 in FIG. 3. A data storage system 250 may store to-be-processed data of the execution device 210. The data storage system 250 may be integrated on the execution device 210, or may be disposed on a cloud or another network server.

The data processing device in FIG. 1 and FIG. 2 may perform data training/machine learning/deep learning by using a neural network model or another model (for example, a support vector machine-based model), and paraphrase an input sentence by using a model finally obtained through training or learning by using data, to obtain a paraphrased sentence.

Because the embodiments of this disclosure relate to massive application of a neural network, for ease of understanding, the following describes terms and concepts related to the neural network that may be used in the embodiments of this disclosure.

(1) Neural Network

The neural network may include a neuron. The neuron may be an operation unit that uses $x_s$ and an intercept of 1 as an input. An output of the operation unit may be as follows:

$$h_{W,b}(x) = f(W^T x) = f\left(\sum_{s=1}^{n} W_s x_s + b\right),$$

where s=1, 2, . . . , n, n is a natural number greater than 1, $W_s$ is a weight of $x_s$, b is a bias of the neuron, and f represents an activation function (activation function) of the neuron, where the activation function is used to introduce a nonlinear characteristic into the neural network, to convert an input signal in the neuron into an output signal. The output signal of the activation function may be used as an input of a next layer, and the activation function may be a sigmoid function. The neural network is a network constituted by connecting a plurality of single neurons together. To be specific, an output of a neuron may be an input of another neuron. An input of each neuron may be connected to a local receptive field of a previous layer to extract a feature of the local receptive field. The local receptive field may be a region including several neurons.

(2) Deep Neural Network

The deep neural network (DNN) is also referred to as a multi-layer neural network, and may be understood as a neural network having a plurality of hidden layers. The DNN is divided based on positions of different layers. Neural networks inside the DNN may be classified into three types: an input layer, a hidden layer, and an output layer. Generally, a first layer is the input layer, a last layer is the output layer, and a middle layer is the hidden layer. Layers are fully connected. To be specific, any neuron in an $i^{th}$ layer is necessarily connected to any neuron in an $(i+1)$th layer.

Although the DNN seems complex, work of each layer is actually not complex, and is simply expressed by the following linear relational expression: $\vec{y}=a(W\vec{x}+\vec{b})$. $\vec{x}$ represents an input vector, $\vec{y}$ represents an output vector, $\vec{b}$ represents a bias vector, W represents a weight matrix (which is also referred to as a coefficient), and a( ) represents an activation function. In each layer, only such a simple operation is performed on the input vector $\vec{x}$ to obtain the output vector $\vec{y}$. Due to a large quantity of DNN layers, quantities of coefficients W and bias vectors $\vec{b}$ are also large. These parameters are defined in the DNN as follows: The coefficient W is used as an example. It is assumed that in a three-layer DNN, a linear coefficient from a fourth neuron in a second layer to a second neuron in a third layer is defined as $W_{24}^3$. A superscript 3 represents a number of a layer in which the coefficient W is located, and a subscript corresponds to an index 2 of the third layer for output and an index 4 of the second layer for input.

In conclusion, a coefficient from a $k^{th}$ neuron in an $(L-1)^{th}$ layer to a $j^{th}$ neuron in an $L^{th}$ layer is defined as $W_{jk}^L$.

It should be noted that the input layer has no parameter W. In the deep neural network, more hidden layers make the network more capable of describing a complex case in the real world. Theoretically, a model with more parameters has higher complexity and a larger "capacity". It indicates that the model can complete a more complex learning task. Training of the deep neural network is a process of learning a weight matrix, and a final objective of the training is to obtain a weight matrix of all layers of a trained deep neural network (a weight matrix formed by vectors W of many layers).

(3) Convolutional Neural Network

The convolutional neural network (CNN) is a deep neural network with a convolutional structure. The convolutional neural network includes a feature extractor including a convolutional layer and a sub-sampling layer. The feature extractor may be considered as a filter. The convolutional layer is a neuron layer that performs convolution processing on an input signal that is in the convolutional neural network. In the convolutional layer of the convolutional neural network, one neuron may be connected to only a part of neurons in a neighboring layer. A convolutional layer generally includes several feature planes, and each feature plane may include some neurons arranged in a rectangle. Neurons of a same feature plane share a weight, and the shared weight herein is a convolution kernel. Sharing the weight may be understood as that a manner of extracting image information is unrelated to a position. The convolution kernel may be initialized in a form of a matrix of a random size. In a training process of the convolutional neural network, an appropriate weight may be obtained for the convolution kernel through learning. In addition, sharing the weight is advantageous because connections between layers of the convolutional neural network are reduced, and a risk of overfitting is reduced.

(4) Recurrent Neural Network

The recurrent neural network (RNN) is used to process sequence data. In a conventional neural network model, from an input layer to a hidden layer and then to an output layer, the layers are fully connected, but nodes in each layer are not connected. This common neural network resolves many problems, but is still incompetent to resolve many other problems. For example, to predict a next word in a sentence, a previous word usually needs to be used, because adjacent words in the sentence are not independent. A reason why the RNN is referred to as a recurrent neural network is that a current output of a sequence is related to a previous output. A specific representation form is that the network memorizes previous information and applies the previous information to calculation of the current output. To be specific, nodes in the hidden layer are no longer unconnected, but are connected, and an input for the hidden layer includes not only an output of the input layer but also an output of the hidden layer at a previous moment. Theoretically, the RNN can process sequence data of any length.

Training of the RNN is the same as training of a conventional CNN or DNN. Similarly, an error back propagation (BP) algorithm is used, but a difference exists. For example, if unfolding is performed on the RNN, parameters W, U, and V are shared, but the parameters are not shared in a conventional neural network. In addition, during use of a gradient descent algorithm, an output in each step depends not only on a network in the current step, but also on a network status in several previous steps. For example, when t=4, the output in each step further needs to be transferred three steps backward, and various gradients need to be added in the three subsequent steps. The learning algorithm is referred to as time-based back propagation algorithm.

A reason why the recurrent neural network is required when there is the convolutional neural network is simple. In the convolutional neural network, there is a premise that elements are independent of each other, and an input and an output are also independent, such as a cat and a dog. However, many elements are interconnected in the real world. For example, stocks change over time. For another example, a person says: I like traveling, a most favorite place is Yunnan, and I will go there in the future if there is a chance. If there is a blank to be filled herein, people should know that "Yunnan" is to be filled in. This is because people can make an inference from a context, but how can a machine do this? The RNN emerges. The RNN is designed to enable a machine to have a capability to remember like human beings. Therefore, an output of the RNN depends on current input information and historical memory information.

(5) Loss Function

In a process of training a deep neural network, because it is expected that an output of the deep neural network is as close as possible to a value that is actually expected to be predicted, a predicted value of a current network and a target value that is actually expected may be compared, and then, a weight vector of each layer of the neural network is updated based on a difference between the two (certainly, there is usually an initialization process before the first update, that is, a parameter is preconfigured for each layer in the deep neural network). For example, if the predicted value of the network is higher, the weight vector is adjusted to obtain a lower predicted value. The weight vector is continuously adjusted until the deep neural network can predict the target value that is actually expected or a value that is very close to the target value that is actually expected. Therefore, "how to obtain, through comparison, a difference between the predicted value and the target value" needs to be predefined. This is a loss function (loss function) or an objective function (objective function). The loss function and the objective function are important equations used to measure the difference between the predicted value and the target value. The loss function is used as an example. A higher output value (loss) of the loss function indicates a larger difference. Therefore, training of the deep neural network becomes a process of reducing the loss as much as possible.

(6) Back Propagation Algorithm

In a training process, a neural network may correct values of parameters in an initial neural network model by using an error back propagation (BP) algorithm, so that a reconstruction error loss of the neural network model becomes increasingly smaller. Specifically, an input signal is forward transferred until an error loss occurs during output, and the parameters in the initial neural network model are updated based on back propagation error loss information, so that the error loss is reduced. The back propagation algorithm is a back propagation motion mainly dependent on the error loss, and aims to obtain parameters of an optimal neural network model, for example, a weight matrix.

Figure 4:
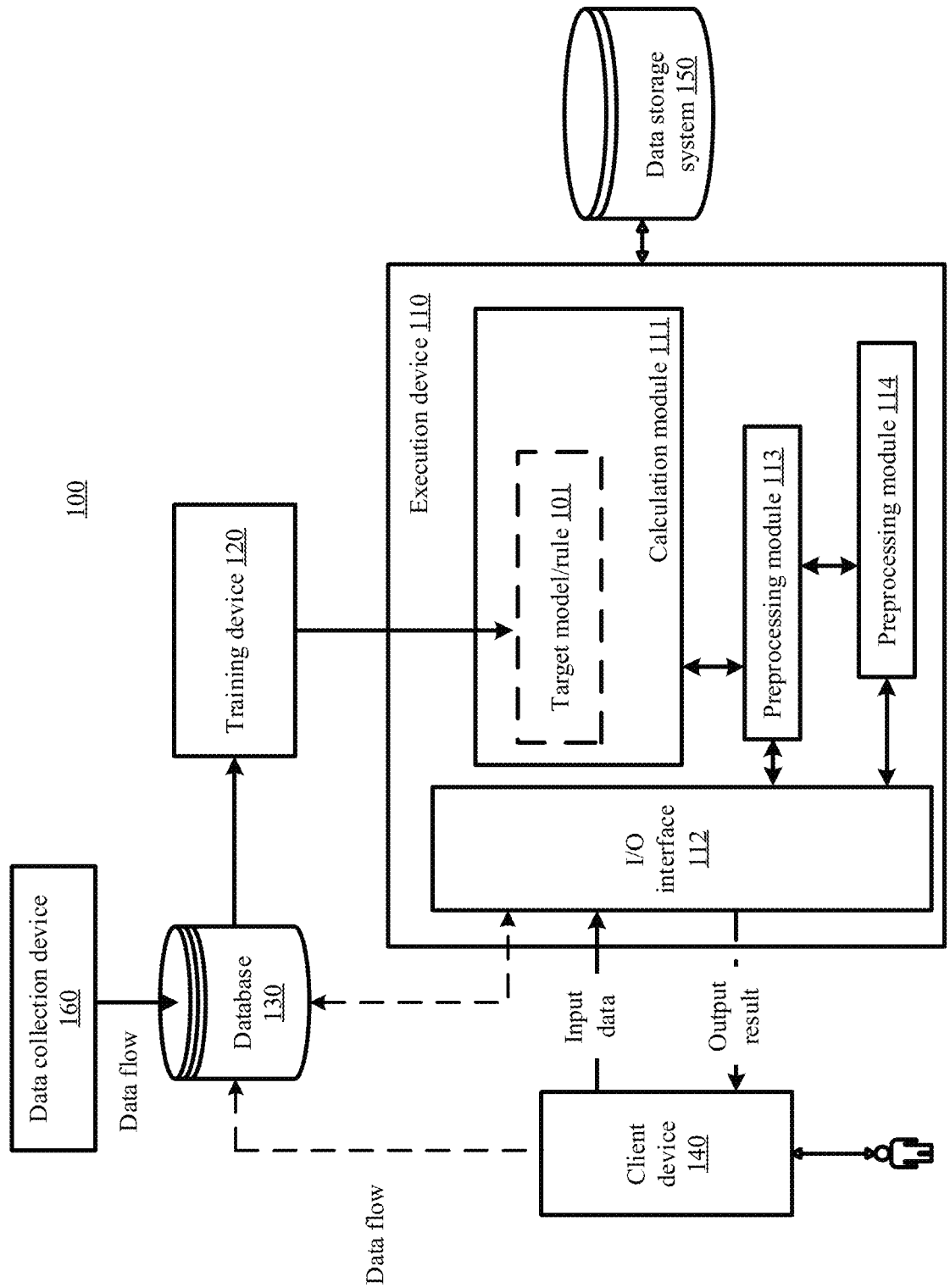
FIG. 4 is a schematic diagram of a system architecture according to an embodiment of this disclosure.

FIG. 4 shows a system architecture 100 according to an embodiment of this disclosure. In FIG. 4, a data collection device 160 is configured to collect training data. In this embodiment of this disclosure, the training data includes a paraphrased sentence pair, namely, a training sentence and a paraphrased sentence of the training sentence.

After collecting the training data, the data collection device 160 stores the training data in a database 130. A training device 120 obtains a target model/rule 101 through training based on the training data maintained in the database 130.

The following describes a process in which the training device 120 obtains the target model/rule 101 based on the training data. The training device 120 processes the training sentence to obtain the paraphrased sentence, and determines a reward (reward) of the target model/rule 101 based on the paraphrased sentence, until the reward of the target model/rule 101 is greater than a threshold (and/or less than a threshold), to complete training of the target model/rule 101.

The target model/rule 101 can be used to implement the sentence paraphrase method in the embodiments of this disclosure, that is, the paraphrased sentence can be obtained by performing related preprocessing on the training sentence (a preprocessing module 113 and/or a preprocessing module 114 may be used for processing) and then inputting the training sentence into the target model/rule 101. The target model/rule 101 in this embodiment of this disclosure may be specifically a neural network (or a plurality of neural networks). It should be noted that, during actual application, the training data maintained in the database 130 may not all be collected by the data collection device 160, or may be received and obtained from another device. It should be further noted that the training device 120 may not necessarily train the target model/rule 101 completely based on the training data maintained in the database 130, or may obtain training data from a cloud or another place to perform model training. The foregoing description should not be construed as a limitation on the embodiments of this disclosure.

The target model/rule 101 obtained through training by the training device 120 may be applied to different systems or devices, for example, an execution device 110 shown in FIG. 4. The execution device 110 may be a terminal, for example, a mobile phone terminal, a tablet, a laptop computer, an augmented reality (AR)/virtual reality (VR) terminal, or a vehicle-mounted terminal, or may be a server, a cloud, or the like. In FIG. 4, the execution device 110 is provided with an input/output (I/O) interface 112, configured to exchange data with an external device. A user may input data to the I/O interface 112 through a client device 140. The input data in this embodiment of this disclosure may include training data input through the client device.

The preprocessing module 113 and the preprocessing module 114 are configured to perform preprocessing (which may be specifically processing the training sentence to obtain a word vector) based on the input data (for example, the training sentence) received by the I/O interface 112. In this embodiment of this disclosure, the preprocessing module 113 and the preprocessing module 114 may alternatively not exist (or only one of the preprocessing modules exist), and a calculation module 111 is directly configured to process the input data.

In a process in which the execution device 110 performs preprocessing on the input data or the calculation module 111 of the execution device 110 performs related processing such as calculation, the execution device 110 may invoke data, code, and the like in a data storage system 150 for corresponding processing, and may also store data, instructions, and the like obtained through corresponding processing into the data storage system 150.

Finally, the I/O interface 112 feeds back a processing result such as the paraphrased sentence to the client device 140.

It should be noted that the training device 120 may generate, for different downstream systems, target models/rules 101 corresponding to the downstream systems, and the corresponding target models/rules 101 may be used to implement the foregoing objectives or complete the foregoing tasks, to provide required results for the user.

In a case shown in FIG. 4, the user may manually input data (for example, inputting a segment of text), and the user may input the data on an interface provided by the I/O interface 112. In another case, the client device 140 may automatically send input data (for example, inputting a segment of text) to the I/O interface 112. If the client device 140 needs to be authorized by the user to automatically send the input data, the user may set a corresponding permission in the client device 140. The user may view, on the client device 140, a result that is output by the execution device 110. The output result may be specifically presented in a specific manner such as display, sound, and an action (for example, the output result may be the paraphrased sentence). The client device 140 may also serve as a data collection end to collect, as new sample data, input data that is input into the I/O interface 112 and an output result that is output from the I/O interface 112 that are shown in the figure, and store the new sample data into the database 130. Certainly, the client device 140 may alternatively not perform collection, but the I/O interface 112 directly stores, as new sample data into the database 130, input data that is input into the I/O interface 112 and an output result that is output from the I/O interface 112 that are shown in the figure.

It should be noted that FIG. 4 is merely a schematic diagram of the system architecture according to this embodiment of this disclosure. A location relationship between devices, components, modules, and the like shown in the figure does not constitute any limitation. For example, in FIG. 4, the data storage system 150 is an external memory relative to the execution device 110. In another case, the data storage system 150 may alternatively be disposed in the execution device 110.

As shown in FIG. 4, the target model/rule 101 is obtained by the training device 120 through training. The target model/rule 101 may be a sentence paraphrase model in the embodiments of this disclosure. Specifically, the sentence paraphrase model in the embodiments of this disclosure may include a plurality of neural networks. The plurality of neural networks may include a CNN, a deep convolutional neural network (DCNN), a recurrent neural network (RNN), and the like.

Figure 5:
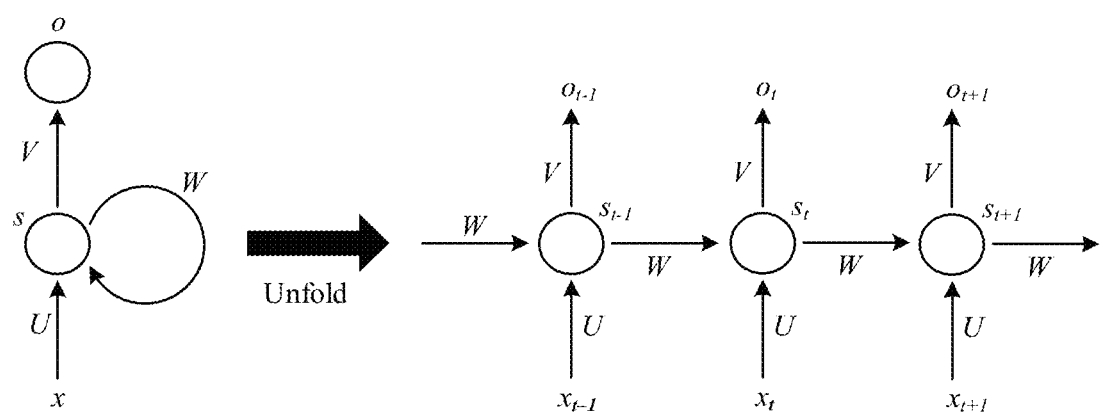
FIG. 5 is a schematic diagram of an RNN model according to an embodiment of this disclosure.

Because the RNN is a common neural network, the following mainly describes a structure of the RNN in detail with reference to FIG. 5.

FIG. 5 is a schematic diagram of a structure of an RNN model according to an embodiment of this disclosure. Each circle may be considered as a unit, and the units have a same task. Therefore, the model may be folded into a shape in the left half figure. The RNN may be explained in one sentence, that is, the RNN is reuse of a unit structure.

The RNN is a sequence to sequence (seq2seq) model. It is assumed that $x_{t-1}$, $x_t$, and $x_{t+1}$ are an input: "wo shi zhongguo". In this case, $o_{t-1}$ and $o_t$ should correspond to "shi" and "zhongguo". What is a predicted next word most likely to be? There is a high probability that $o_{t+1}$ is "ren".

Therefore, the following definition may be given:

$x_t$ represents an input at a moment t, $O_t$ represents an output at the moment t, and $s_t$ represents memory at the moment t. An output at a current moment depends on memory and the input at the current moment. For example, if a person is a senior, knowledge of the person is a combination of knowledge (current input) that the person learns in the senior year and knowledge (memory) that the person learns in the junior year and before the junior year. The RNN is similar in terms of this idea. The neural network is best at integrating a large amount of content by using a series of parameters and then learning the parameter. Therefore, a basis of the RNN is defined as follows:

$$s_t = f(U * x_t + W * s_{t-1}),$$

where the function $f(\ )$ is an activation function in the neural network, but why does the function need to be added? For example, if a person learns a very good problem-resolving method in a university, does a problem-resolving method in a junior high school still need to be used? It is clearly that the problem-resolving method is not used. An idea of the RNN is the same. As the RNN can memorize information, the RNN certainly memorizes only important information, and forgets other unimportant information. However, what is most suitable to filter information in the neural network? The answer is definitely the activation function. Therefore, an activation function is used herein to perform nonlinear mapping, so as to filter information. The activation function may be tanh or ReLU, or may be another function.

It is assumed that a senior student is graduating and expects to take part in the postgraduate entrance examination. In this case, should the student first memorize learned content before taking part in the postgraduate entrance examination or should the student take several books to directly take part in the postgraduate entrance examination? It is clearly that the idea of the RNN is to perform prediction with the memory $s_t$ at the current moment during prediction. To predict a probability that the next word occurs in "wo shi zhongguo", it is clearly herein that softmax is most suitable to predict a probability that each word occurs. However, during prediction, because a matrix cannot be directly used for prediction, a weight matrix V needs to be further used during prediction. A calculation process for prediction is expressed as the following formula:

$$o_t = softmax(V * s_t),$$

where $O_t$ is the output at the moment t.

It should be noted that the RNN shown in FIG. 5 is merely an example of the recurrent neural network. In specific application, the recurrent neural network may alternatively exist in a form of another network model.

Figure 6:
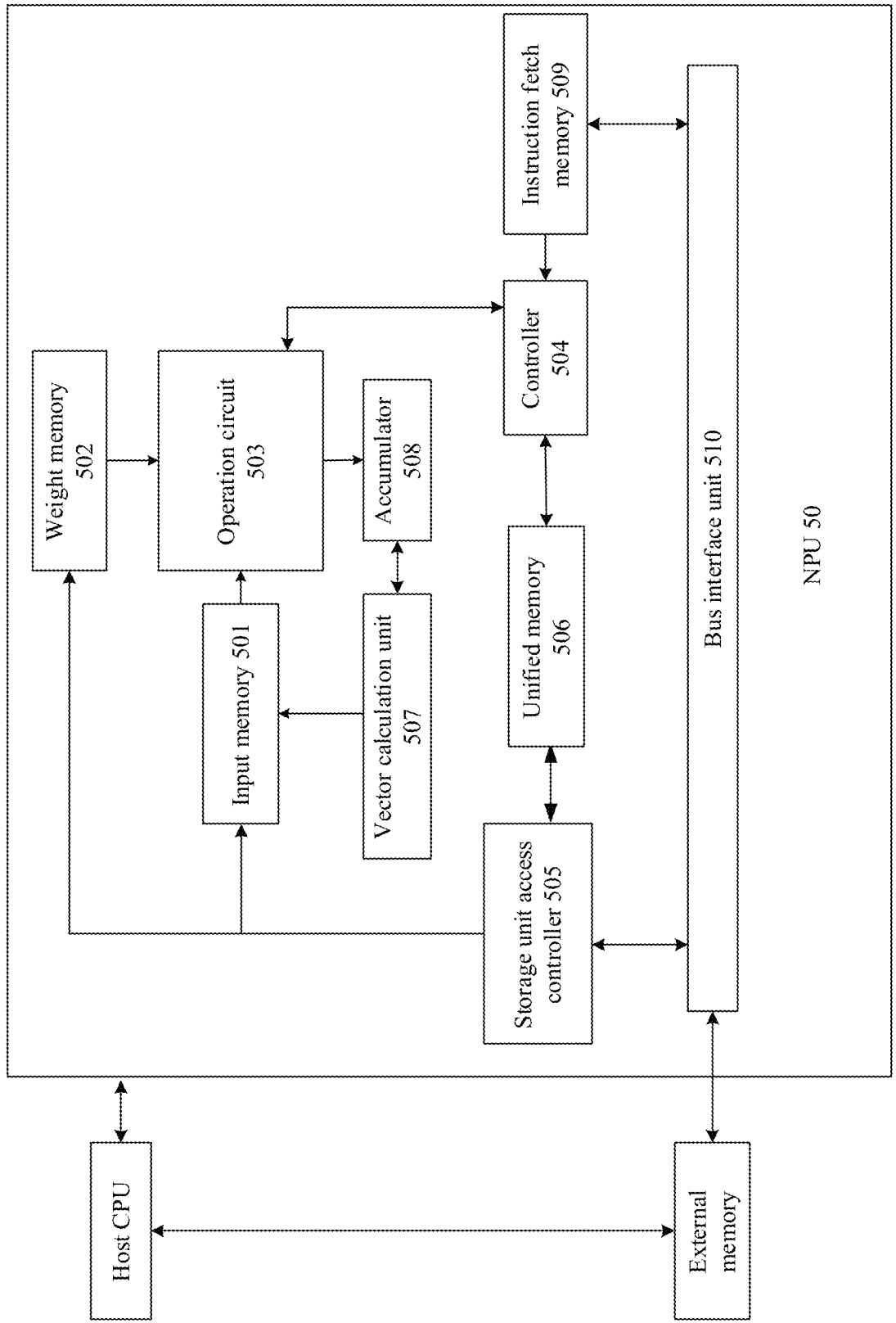
FIG. 6 is a schematic diagram of a hardware structure of a chip according to an embodiment of this disclosure.

FIG. 6 is a schematic diagram of a hardware structure of a chip according to an embodiment of this disclosure. The chip includes a neural processing unit (neural processing unit, NPU) 50. The chip may be disposed in the execution device 110 shown in FIG. 4, and is configured to complete calculation work of the calculation module 111. The chip may alternatively be disposed in the training device 120 shown in FIG. 4, and is configured to complete training work of the training device 120 and output the target module/rule 101. An algorithm in the recurrent neural network shown in FIG. 5 may be implemented in the chip shown in FIG. 6, or the sentence paraphrase model in the embodiments of this disclosure may be implemented in the chip shown in FIG. 6.

The sentence paraphrase method in the embodiments of this disclosure may be specifically performed in an operation circuit 503 and/or a vector calculation unit 507 in the NPU 50, to obtain a paraphrased sentence.

The following briefly describes modules and units in the NPU 50.

The NPU 50 serves as a coprocessor, and may be disposed on a host CPU (host CPU). The host CPU assigns a task. A core part of the NPU 50 is the operation circuit 503. When the NPU 50 works, a controller 504 in the NPU 50 may control the operation circuit 503 to extract data from a memory (a weight memory or an input memory) and perform an operation.

In some implementations, the operation circuit 503 internally includes a plurality of process engine (process engine, PE). In some implementations, the operation circuit 503 is a two-dimensional systolic array. Alternatively, the operation circuit 503 may be a one-dimensional systolic array or another electronic circuit that can perform mathematical operations such as multiplication and addition. In some implementations, the operation circuit 503 is a general-purpose matrix processor.

For example, it is assumed that there are an input matrix A, a weight matrix B, and an output matrix C. The operation circuit extracts corresponding data of the matrix B from the weight memory 502, and buffers the corresponding data into each PE in the operation circuit. The operation circuit extracts data of the matrix A from the input memory 501, performs a matrix operation between the data of the matrix A and the matrix B to obtain a partial matrix result or a final matrix result, and stores the result into an accumulator (accumulator) 508.

A vector calculation unit 507 may perform further processing on the output of the operation circuit, for example, perform vector multiplication, vector addition, an exponential operation, a logarithmic operation, and value comparison. For example, the vector calculation unit 507 may be configured to perform network calculation, such as pooling, batch normalization, or local response normalization (local response normalization), at a non-convolutional/non-fully connected layer (FC) of a neural network.

In some implementations, the vector calculation unit 507 can store a processed output vector in a unified memory 506. For example, the vector calculation unit 507 may apply a non-linear function to the output, for example, a vector of an accumulated value, of the operation circuit 503 to generate an activation value. In some implementations, the vector calculation unit 507 generates a normalized value, a combined value, or both. In some implementations, the processed output vector can be used as an activation input to the operation circuit 503, for example, used in a subsequent layer in the neural network.

The unified memory 506 is configured to store input data and output data.

A direct memory access controller (DMAC) 505 transfers input data in an external memory to the input memory 501 and/or the unified memory 506, stores, in the weight memory 502, weight data in the external memory, and stores, in the external memory, data in the unified memory 506.

A bus interface unit (BIU) 510 is configured to implement interaction between the host CPU, the DMAC, and an instruction fetch buffer 509 by using a bus.

The instruction fetch buffer (instruction fetch buffer) 509 connected to the controller 504 is configured to store instructions used by the controller 504.

The controller 504 is configured to invoke the instructions buffered in the instruction fetch buffer 509, to control a working process of the operation accelerator.

Usually, the unified memory 506, the input memory 501, the weight memory 502, and the instruction fetch buffer 509 may all be on-chip memories. The external memory of the NPU may be a memory outside the NPU, and the external memory may be a double data rate synchronous dynamic random access memory (DDR SDRAM), a high bandwidth memory (HBM), or another readable and writable memory.

The following describes in detail the sentence paraphrase method in the embodiments of this disclosure with reference to the accompanying drawings. The sentence paraphrase method in the embodiments of this disclosure may be performed by a device such as the data processing device in FIG. 1, the user equipment in FIG. 2, the execution device 210 in FIG. 3, and the execution device 110 in FIG. 4. The execution device 110 in FIG. 4 may include the RNN model shown in FIG. 5 and the chip shown in FIG. 6.

Figure 7:
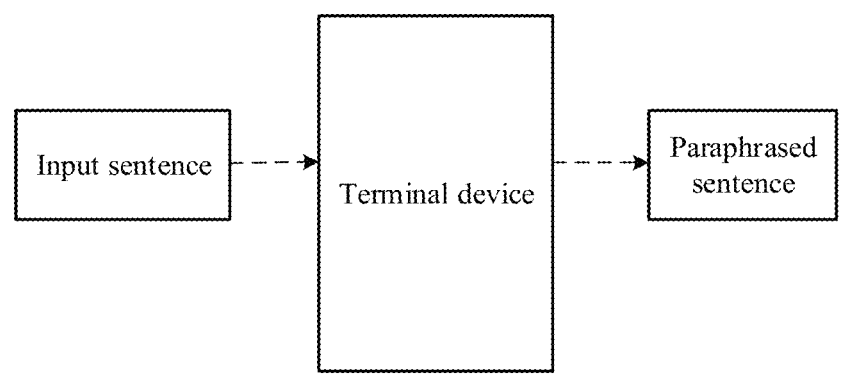
FIG. 7 is a schematic diagram of an application scenario according to an embodiment of this disclosure.

The sentence paraphrase method provided in the embodiments of this disclosure may be performed on a server, may be performed on a cloud, or may be performed on a terminal device. The terminal device is used as an example. The terminal device is used as an example. As shown in FIG. 7, the technical solutions of the embodiments of this disclosure may be applied to the terminal device. In the sentence paraphrase method in the embodiments of this disclosure, an input sentence may be paraphrased to obtain a paraphrased sentence of the input sentence. The terminal device may be mobile or fixed. For example, the terminal device may be a mobile phone having a natural language processing function, a tablet personal computer (TPC), a media player, a smart television, a laptop computer (LC), a personal digital assistant (PDA), a personal computer (PC), a camera, a video camera, a smartwatch, a wearable device (WD), an autonomous driving vehicle, or the like. The terminal device is not limited in this embodiment of this disclosure.

A paraphrase is a different expression having same semantics as a sentence. The paraphrase is very common in a natural language, and the paraphrase is also increasingly widely used in the field of natural language processing (natural language processing, NLP). For example, the paraphrase may be applied to a plurality of the following fields:

(1) Machine Translation

In machine translation, a paraphrase technology may be used to synonymously rewrite a to-be-translated sentence to generate a sentence that is easier to translate. For example, a flexible but non-standard spoken language is paraphrased to obtain a standard sentence, so that a better result is obtained through translation. For another example, the paraphrase technology may also alleviate a problem of sparse data in a machine translation system, that is, increase, through paraphrasing, a training corpus for increasing translation. In addition, the paraphrase technology is also used to improve evaluation of machine translation.

(2) Automatic Question Answering System

In the question answering system, the paraphrase technology may be used to synonymously extend a question sentence, that is, generate a plurality of question sentences having a same meaning as the original question sentence, so that a problem that a same question has different expressions is resolved, and a recall rate of the question answering system is improved. For example, a question submitted by a user to the question answering system may be rewritten online, and then the rewritten question is submitted to the question answering system to recall a result. Alternatively, some text content in a knowledge base may be paraphrased and extended, and added to the knowledge base.

(3) Information Extraction

The paraphrase technology can automatically generate a large quantity of extraction templates for an extraction system, to improve performance of the extraction system.

(4) Information Retrieval

Similar to the application in the question answering system, the paraphrase technology may be used to rewrite and extend a query word, to optimize information retrieval quality.

(5) Automatic Summarization

In an automatic summarization task, the paraphrase technology may be used to calculate a similarity between sentences, to better perform sentence clustering, selection, and the like. Second, similar to the application in machine translation, the paraphrase technology may be used to improve evaluation of automatic summarization.

It should be noted that the sentence paraphrase method in the embodiments of this disclosure may be applied to all the foregoing fields.

In natural language processing, paraphrasing mainly includes two types of tasks: paraphrase quality and paraphrase diversity.

The paraphrase quality means whether a generated paraphrased sentence is fluent and consistent with an input sentence in terms of semantics. For example, the input sentence is "taiyang dao diqiu de juli shi duoshao". If the generated paraphrased sentence is "diqiu yu taiyang xiangju duo yuan", the paraphrased sentence is fluent and has a same meaning as the input sentence, and therefore is generated with high paraphrase quality. If the generated paraphrased sentence is "diqiu de taiyang shi duoshao dao juli", the paraphrased sentence is not fluent. If the generated paraphrased sentence is "yueliang dao huoxing de juli shi duoshao", the paraphrased sentence is not related to the semantics of the input sentence. Both the two paraphrased sentences are low-quality paraphrased sentences.

The paraphrase diversity means whether a generated paraphrased sentence is diverse and informative. For example, an input sentence is "taiyang dao diqiu de juli shi duoshao", a plurality of generated paraphrased sentences are respectively "diqiu li taiyang you duo yuan", "ridi xiangju duoshao gongli", and "taiyang yu diqiu zhijian you duoshao qianmi", and the plurality of paraphrased sentences have a same meaning as the input sentence, but are all different expressions of the input sentence. In this case, the plurality of paraphrased sentences have good diversity.

However, in practice, it is often difficult to ensure diversity of the paraphrased sentence while ensuring quality of the paraphrased sentence.

Based on the foregoing problem, the embodiments of this disclosure provide a sentence paraphrase method and a method for training a sentence paraphrase model, to improve diversity of a paraphrased sentence and quality of the paraphrased sentence.

Figure 8:
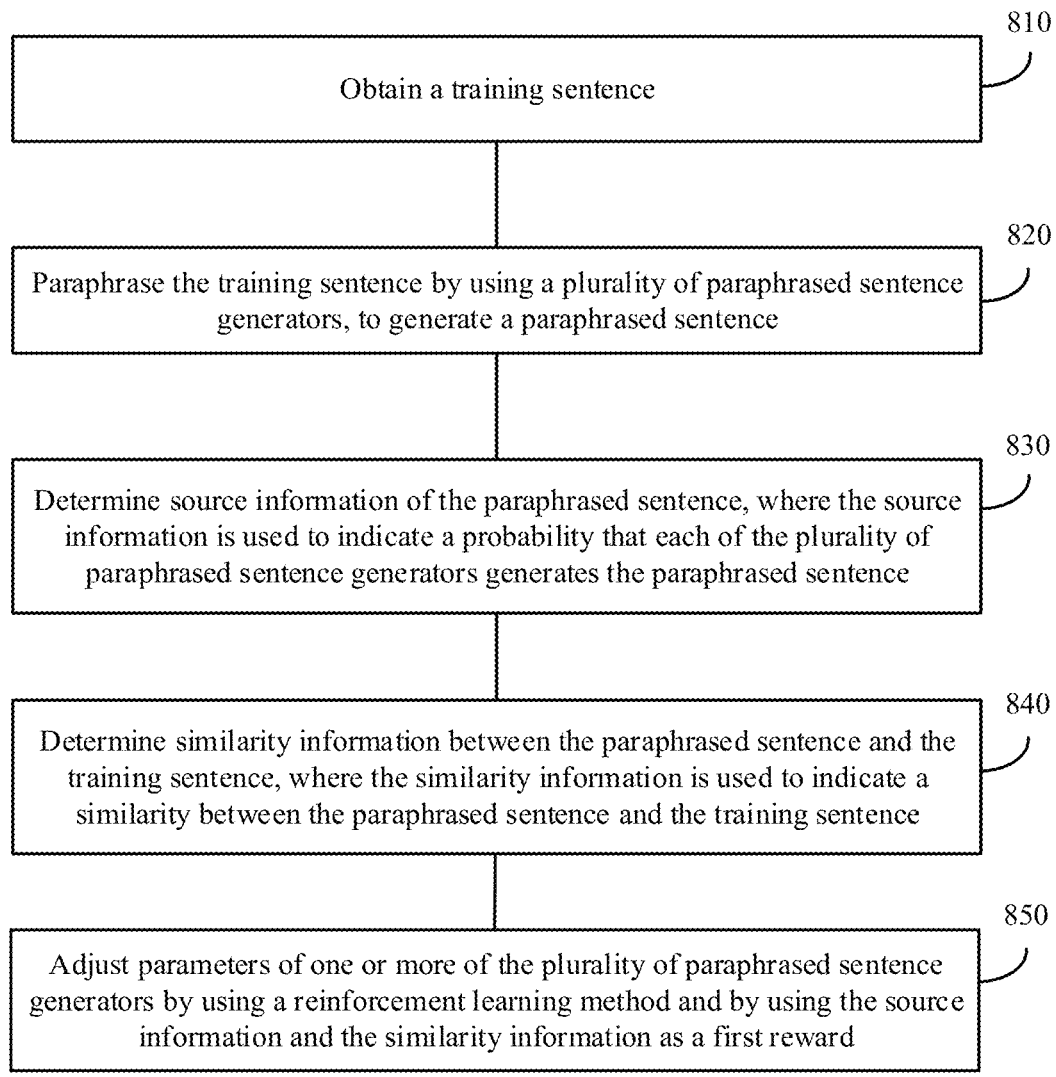
FIG. 8 is a schematic flowchart of a method for training a sentence paraphrase model according to an embodiment of this disclosure.

FIG. 8 is a schematic flowchart of a method for training a sentence paraphrase model according to an embodiment of this disclosure. The method shown in FIG. 8 may be performed by the terminal device in FIG. 7.

In this embodiment of this disclosure, a sentence paraphrase model may be used to paraphrase an input sentence (or a training sentence). The sentence paraphrase model may include a plurality of preset paraphrased sentence generators, each of the plurality of paraphrased sentence generators is used to generate a paraphrased sentence, and each of the plurality of paraphrased sentence generators may include one neural network.

The method shown in FIG. 8 includes step 810, step 820, step 830, step 840, and step 850. The following separately describes the steps in detail.

S810. Obtain a training sentence.

The training sentence may be a word, a phrase, or a sentence. In addition, the training sentence may also be in various languages. This is not limited in this embodiment of this disclosure.

S820. Paraphrase the training sentence by using the plurality of paraphrased sentence generators, to generate a paraphrased sentence.

The paraphrased sentence may be a word, a phrase, or a sentence. In addition, the paraphrased sentence may also be in various languages. This is not limited in this embodiment of this disclosure.

The sentence paraphrase model in this embodiment of this disclosure includes a plurality of paraphrased sentence generators, and each paraphrased sentence generator thereof may generate a high-quality paraphrased sentence. Therefore, the plurality of paraphrased sentence generators in the sentence paraphrase model may be flexibly applied to fields such as machine translation, automatic question answering system, and information retrieval.

Optionally, in S820, when the training sentence is paraphrased by using the plurality of paraphrased sentence generators, one paraphrased sentence generator may generate a paraphrased sentence, or a plurality of paraphrased sentence generators may generate a plurality of paraphrased sentences. This is not limited in this embodiment of this disclosure.

For example, when the training sentence may be paraphrased by using the plurality of paraphrased sentence generators, one paraphrased sentence generator may generate one paraphrased sentence. In this case, the paraphrased sentence generator may be the following first paraphrased sentence generator.

Alternatively, the training sentence may be paraphrased by using two paraphrased sentence generators, to generate two paraphrased sentences. In this case, the two paraphrased sentence generators may be the following first paraphrased sentence generator.

It should be noted that, in a process of training the sentence paraphrase model by using the method in FIG. 8, when the training sentence is paraphrased by using the plurality of paraphrased sentence generators, a number of a paraphrased sentence generator that generates the paraphrased sentence may be known in advance.

For example, in S820, the training sentence may be paraphrased by a paraphrased sentence generator $G_1$ in the plurality of paraphrased sentence generators to generate a paraphrased sentence. In this case, a number (for example, a number "1") of the paraphrased sentence generator $G_1$ that generates the paraphrased sentence may be used as a label of the paraphrased sentence, to train a source discriminator in the following S830 while training the sentence paraphrase model. In this way, accuracy of source information can be continuously improved. It may be learned that a training process of the source discriminator is supervised training.

Optionally, the plurality of paraphrased sentence generators may include a plurality of neural networks.

For example, an "encoder-decoder" architecture may be used for the plurality of paraphrased sentence generators.

Optionally, the plurality of neural networks may be a plurality of recurrent neural networks (RNN), and the plurality of paraphrased sentence generators may include a plurality of RNNs based on the "encoder-decoder" architecture. Optionally, the paraphrased sentence generator may include another neural network (such as a CNN). This is not limited in this embodiment of this disclosure.

Optionally, each of the plurality of paraphrased sentence generators may include one encoder and one decoder. The encoder may be implemented by one RNN, and the decoder may also be implemented by one RNN.

Optionally, the plurality of paraphrased sentence generators may share one encoder, and all of the plurality of paraphrased sentence generators may have respective independent decoders.

Figure 9:
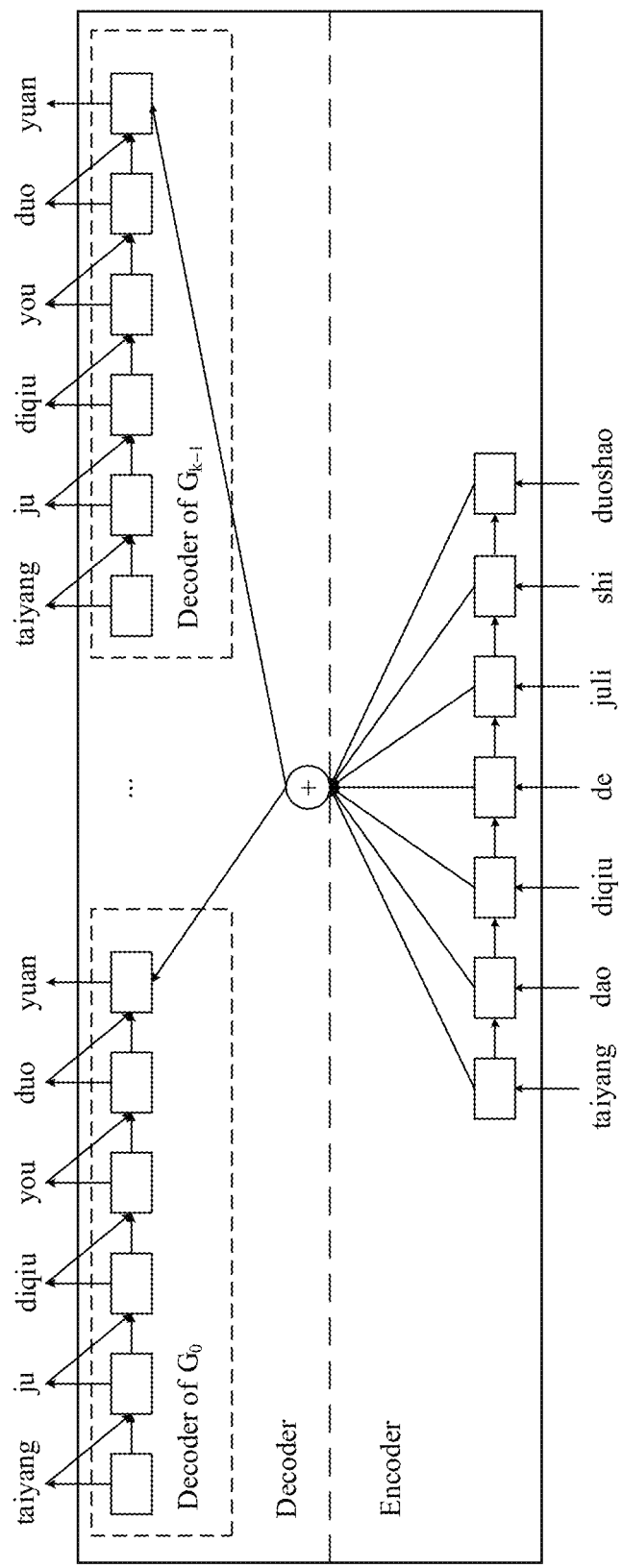
FIG. 9 is a schematic diagram of a sentence paraphrase model according to an embodiment of this disclosure.

For example, as shown in FIG. 9, the sentence paraphrase model may include k paraphrased sentence generators (as shown in FIG. 9, a total of k paraphrased sentence generators such as a paraphrased sentence generator $G_0$, a paraphrased sentence generator $G_1$, . . . , a paraphrased sentence generator $G_{k-1}$). All the paraphrased sentence generators in the sentence paraphrase model may share one encoder, all the paraphrased sentence generators may have respective independent decoders (for example, a decoder of $G_0$, . . . , and a decoder of $G_{k-1}$), and k is a positive integer.

Alternatively, all of the plurality of paraphrased sentence generators may have respective independent encoders and decoders. This is not limited in this embodiment of this disclosure.

In this embodiment of this disclosure, before the sentence paraphrase model is trained by using the method 800 in FIG. 8, the plurality of paraphrased sentence generators in the sentence paraphrase model may be pre-trained by using a paraphrased sentence pair corpus in advance (that is, the plurality of neural networks in the plurality of paraphrased sentence generators are pre-trained).

Optionally, a sequence to sequence (sequence to sequence, seq2seq) model based on deep learning may be used to pre-train the paraphrased sentence generator. A specific process is as follows:

For example, the plurality of paraphrased sentence generators may be first initialized to different initialization states, and a same paraphrased sentence pair corpus $\{X_i, Y_i\}_{n=1}^n$ is used as a training set, to train the plurality of paraphrased sentence generators by using a back propagation (back propagation) algorithm, where $X_i$ and $Y_i$ are a paraphrased sentence pair (namely, a word sequence), for example, $X_i$ is "taiyang dao diqiu de juli shi duoshao", and $Y_i$ is "taiyang li diqiu you duo yuan", and i and n are positive integers.

The plurality of paraphrased sentence generators may be trained based on the parallel paraphrased sentence pair corpus. A $j^{th}$ paraphrased sentence generator in the plurality of paraphrased sentence generators may be represented as follows:

$$P(Y \mid X; \theta_j) = \prod_{t=1}^{T} p(y_t \mid y_1, \ldots, y_{t-1}, X; \theta_j),$$

where $\theta_j$ represents a to-be-learned parameter in the $j^{th}$ paraphrased sentence generator, $\Pi(\ )$ represents a product, $P(Y|X; \theta_j)$ means that for a given input sequence X (X is an input sentence), (several) sequences Y(Y is a paraphrased sentence, and may include $y_1, \ldots, y_{t-1}$) may be generated by using the paraphrased sentence generator, and t, T, and are all positive integers.

In a pre-training process, an RNN may be used as an encoder to process the input sentence to obtain a vector representation of the input sentence. Then, another RNN is used as a decoder, and the vector representation obtained by the encoder is used as an input, to generate the paraphrased sentence word by word.

For example, during pre-training, the encoder may receive an input word sequence (for example, the word sequence may represent a sentence in a natural language, and lengths of all input word sequences may be different). The encoder sequentially calculates state variables (for example, hidden state variables) of all words in the word sequence. A state variable $h_i$ of an $i^{th}$ word may be calculated by using state variables of a current word (namely, the $i^{th}$ word) and a previous word (namely, an $(i-1)^{th}$ word):

$$h_i = f_h(x_i, h_{i-1}),$$

$f_h$ represents a multi-layer neural network, and a possible implementation of $f_h$ is as follows:

$$f_h(x_i, h_{i-1}) = \phi_h(Ux_i + Wh_{i-1} + b),$$

where $$\phi_h(x) = \frac{1}{1 + \exp(-x)},$$

$\phi_h$ is a sigmoid function (for example, U is a word embedding parameter matrix, W is a hidden state weight matrix, and b is a bias.

In this embodiment of this disclosure, a long short-term memory (LSTM) network or a gated recurrent unit (GRU) may be used to model $f_h$. This is not limited in this embodiment of this disclosure.

After the state variable of each word is determined, the decoder may finally generate an output word sequence (for example, the output word sequence may represent a sentence in a natural language). A probability $p(y_t|y_1, \ldots, y_{t-1})$ of generating the $i^{th}$ word is as follows:

$$p(y_i \mid y_1, \ldots, y_{i-1}) = g_h(h_i, y_{i-1}) = \phi_g(U_o y_{i-1} + W_o h_i),$$

where $\phi_g$ is a normalized function (for example, softmax), $U_o$, is a word embedding parameter matrix, and $W_o$, is a hidden state weight matrix.

A probability of generating the output word sequence (namely, a sentence represented by the output word sequence) is as follows:

$$p_{RNN}(\hat{q} \mid z) = p(y_1, \ldots, y_L \mid z) = p(y_1 \mid z) \sum_{i=2}^{T} p(y_i \mid y_1, \ldots, y_{i-1}),$$

where $\hat{q}$ is a predicted sequence, z is a hidden state that is output by the encoder, and i, L, and T are positive integers.

It should be noted that the pre-training process of the paraphrased sentence generator is merely a possible implementation in this embodiment of this disclosure. In this embodiment of this disclosure, the paraphrased sentence generator may be pre-trained based on another deep learning model. This is not limited in this embodiment of this disclosure.

S830. Determine source information of the paraphrased sentence.

The source information may be used to indicate a probability that each of the plurality of paraphrased sentence generators generates the paraphrased sentence.

Optionally, the determining source information of the paraphrased sentence may include: determining the source information of the paraphrased sentence by using a preset source discriminator, where the source discriminator includes a third neural network.

Optionally, the source discriminator may be pre-trained based on the plurality of paraphrased sentence generators, so that the source discriminator can recognize a specific paraphrased sentence generator in the plurality of paraphrased sentence generators that generates the paraphrased sentence generated by the plurality of paraphrased sentence generators.

Optionally, the source discriminator may output the probability that each of the plurality of paraphrased sentence generators generates the paraphrased sentence. For example, it may be considered that the paraphrased sentence is generated by a paraphrased sentence generator having a maximum probability value.

In this embodiment of this disclosure, the source discriminator may be pre-trained.

Optionally, a paraphrased sentence pair corpus may be constructed based on the paraphrased sentence, generated by the plurality of paraphrased sentence generators during training, and the training sentence of the paraphrased sentence, and the source discriminator is trained by using the constructed paraphrased sentence pair corpus.

For example, a paraphrase result $\{\hat{y}_{ij}\}_{i=1}^{k}$, $j \in \{0, \ldots, h\}$ of the paraphrased sentence generator may be used to train the source discriminator, where $y_{ij}$ is the $i^{th}$ word in the input word sequence, and j represents that the $i^{th}$ word is generated by the $j^{th}$ paraphrased sentence generator.

The source discriminator may be represented as a classification model: $f_{D_g}(y_{ij}; \lambda)$, where $\lambda$ is a to-be-learned parameter in the source discriminator.

Figure 10:
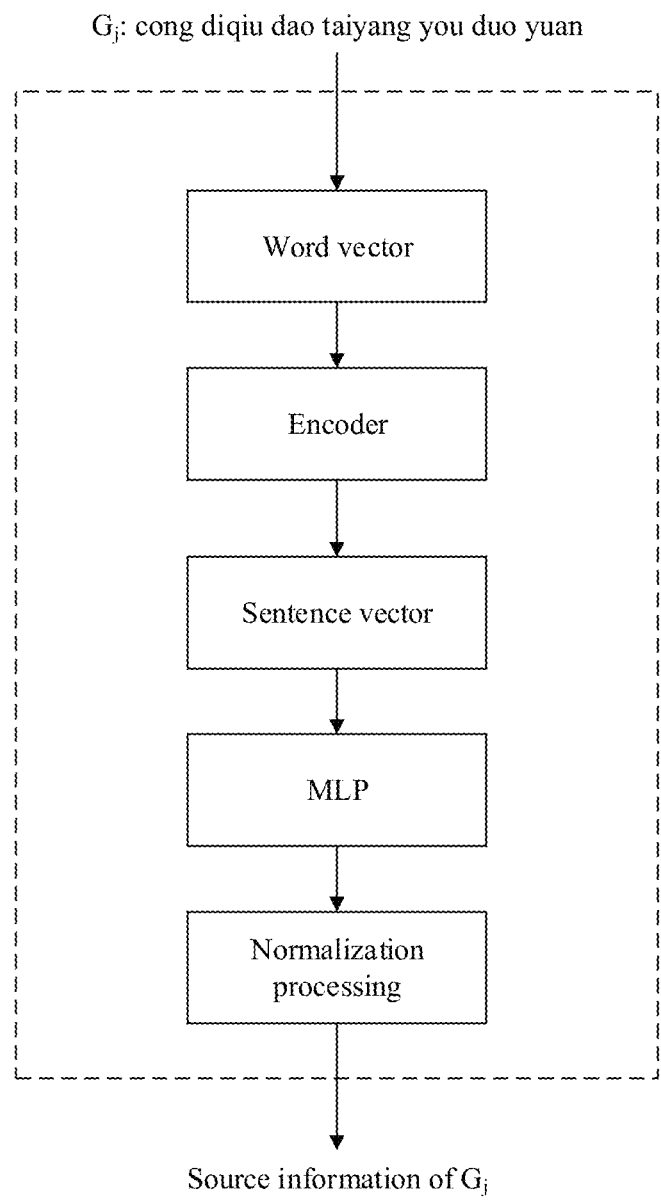
FIG. 10 is a schematic block diagram of a source discriminator according to an embodiment of this disclosure.

Optionally, FIG. 10 is a schematic block diagram of a source discriminator according to an embodiment of this disclosure.

For example, as shown in FIG. 10, for a paraphrased sentence "cong diqiu dao taiyang you duo yuan" generated by a paraphrased sentence generator $G_j$ in the sentence paraphrase model, the source discriminator may first map each word in a word sequence to a word embedding, then encode the word sequence by using an encoder, to convert the word sequence into a fixed-length sentence embedding, and then predict, by using a multilayer perceptron (MLP), a probability that each of the plurality of paraphrased sentence generators generates the paraphrased sentence (namely, "cong diqiu dao taiyang you duo yuan"), where j is a positive integer.

Optionally, in the foregoing pre-training process, for the foregoing paraphrased sentence, the number j of the paraphrased sentence generator that generates the paraphrased sentence is a label of the paraphrased sentence. Therefore, the pre-training process of the source discriminator is supervised training.

After the foregoing pre-training is completed, for the $i^{th}$ word $Y_{ij}$ in the input word sequence, the source discriminator may determine which one of the plurality of paraphrased sentence generators generates the word.

It should be noted that the pre-training process of the source discriminator is merely a possible implementation in this embodiment of this disclosure. In this embodiment of this disclosure, the source discriminator may be pre-trained based on another deep learning model. This is not limited in this embodiment of this disclosure.

S840. Determine similarity information between the paraphrased sentence and the training sentence.

The similarity information may be used to indicate a similarity between the paraphrased sentence and the training sentence. The similarity information herein may be used to evaluate paraphrase quality.

In this embodiment of this disclosure, the sentence paraphrase model may further include a preset similarity discriminator, the similarity discriminator may include a second neural network, and the second neural network may be used to determine the similarity information between the training sentence and the paraphrased sentence of the training sentence.

Optionally, the determining similarity information between the paraphrased sentence and the training sentence may include: determining the similarity information between the paraphrased sentence and the training sentence by using the similarity discriminator.

Optionally, the second neural network may be pre-trained by using a similarity discrimination corpus, so that the second neural network can determine whether a sentence pair constitutes a paraphrase relationship. The similarity discrimination corpus may be a paraphrased sentence pair corpus that includes both a positive sample and a negative sample.

Optionally, the second neural network may be an RNN.

In this embodiment of this disclosure, the similarity discriminator may be pre-trained.

Optionally, the similarity discrimination corpus $\{X_i, Z_i, \pm 1\}_{i=1}^{n}$ may be used to train the similarity discriminator of the paraphrased sentence, where $X_i$ and $Z_i$ are a sentence pair (namely, both $X_i$ and $Z_i$ are word sequences), $\pm 1$ is used to indicate whether $X_i$ and $Z_i$ constitute a paraphrased relationship, +1 indicates that $X_i$ and $Z_i$ constitute a paraphrased sentence, and −1 indicates that $X_i$ and $Z_i$ do not constitute a paraphrased sentence.

Based on the foregoing similarity discrimination corpus, a similarity discriminator that uses two word sequences (namely, input $X_i$ and $Z_i$) as an input may be trained, and the similarity discriminator may be represented as: $f_D(X, Z; \phi)$, where $\phi$ is a to-be-learned parameter in the similarity discriminator, and $\phi$ includes a word embedding parameter, an RNN parameter, and an MLP parameter.

Figure 11:
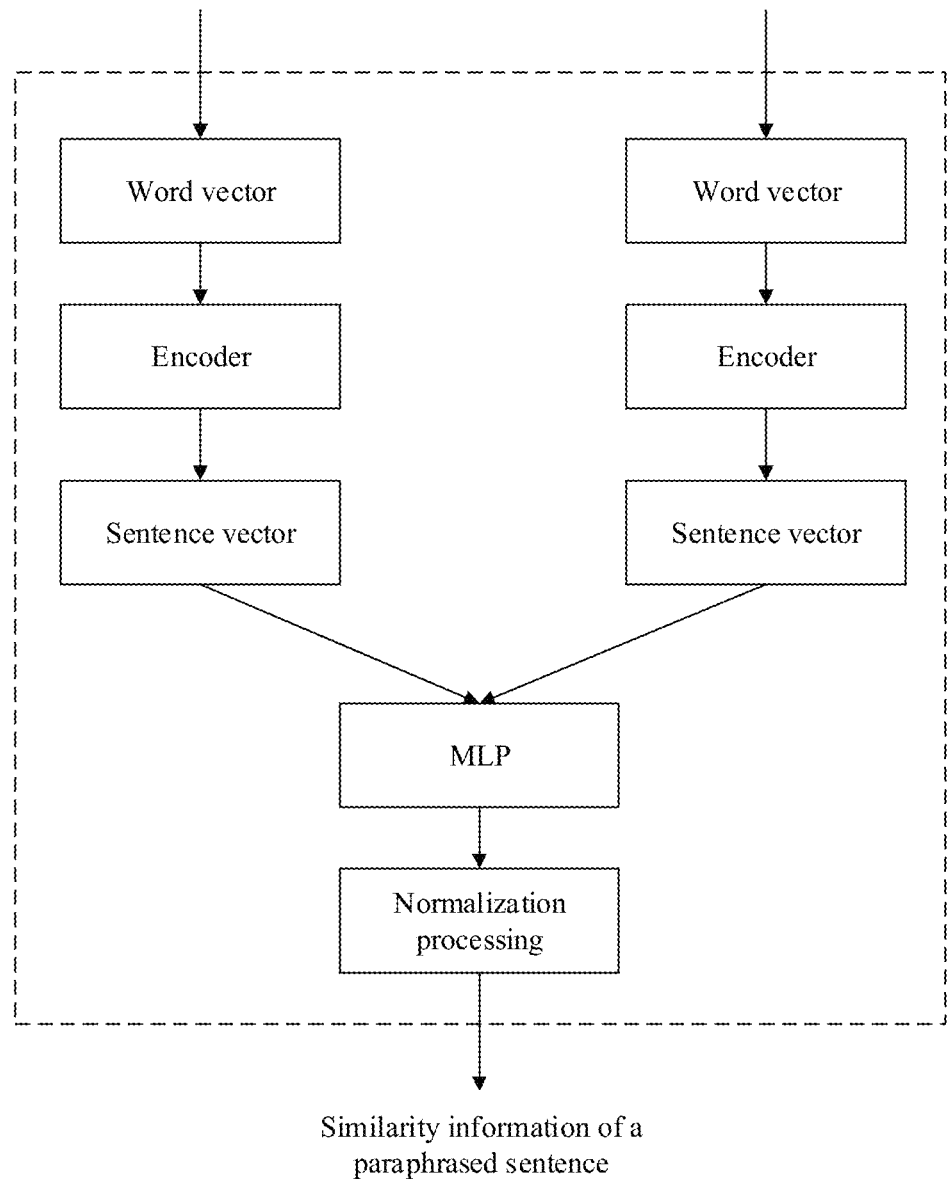
FIG. 11 is a schematic flowchart of a similarity discriminator according to an embodiment of this disclosure.

Optionally, FIG. 11 is a schematic block diagram of a similarity discriminator according to an embodiment of this disclosure.

For example, as shown in FIG. 11, for an input sentence (for example, "taiyang dao diqiu de juli shi duoshao") and a paraphrased sentence (for example, "cong diqiu dao taiyang you duo yuan") of the input sentence that are of a paraphrased sentence generator $G_j$ in the sentence paraphrase model, the similarity discriminator may first map each word in a word sequence of the input sentence to a word vector (word embedding), and then encode the word sequence by using an encoder, to convert the word sequence into a fixed-length sentence embedding, where j is a positive integer.

Similarly, same processing as the foregoing input sentence is performed on a word sequence of the paraphrased sentence, and the two input word sequences share a same parameter (namely, a parameter of the similarity discriminator).

Then, vectors of the two sentences are concatenated, and a degree (or referred to as a semantic similarity) to which the two word sequences (namely, the two sentences) constitute a paraphrase relationship is obtained by using the multilayer perceptron (MLP).

After training is completed, for two given sequences (namely, an input sentence X and a paraphrased sentence Z), the similarity discriminator $f_D(X, Z; \phi)$ determines a degree to which the two sequences constitute a paraphrase relationship or a semantic similarity between the two sequences (namely, the two sentences).

It should be noted that the pre-training process of the similarity discriminator is merely a possible implementation in this embodiment of this disclosure. In this embodiment of this disclosure, the similarity discriminator may be pre-trained based on another deep learning model, for example, a deep matching model. This is not limited in this embodiment of this disclosure.

S850. Adjust parameters of one or more of the plurality of paraphrased sentence generators by using a reinforcement learning method and by using the source information and the similarity information as a first reward.

In this embodiment of this disclosure, the one or more of the plurality of paraphrased sentence generators may be trained by using the reinforcement learning method.

Specifically, in a reinforcement learning framework, the plurality of paraphrased sentence generators are equivalent to agents, and the source discriminator and the similarity discriminator are equivalent to environments.

A process in which the plurality of paraphrased sentence generators generate the paraphrased sentence is equivalent to a series of actions, the source information determined by the source discriminator and the similarity information determined by the similarity discriminator are equivalent to a reward of these actions, and the source information and the similarity information are used as a reward to be fed back to the plurality of paraphrased sentence generators.

In such a reinforcement learning mechanism, the paraphrased sentence generator is trained, so that the plurality of paraphrased sentence generators can obtain a higher reward, that is, a paraphrased sentence generated by each of the plurality of paraphrased sentence generators has a larger difference from a paraphrased sentence generated by another paraphrased sentence generator, and has higher quality.

Optionally, the adjusting parameters of the plurality of paraphrased sentence generators by using the source information and the similarity information as a first reward may include:

adjusting a parameter of each paraphrased sentence generator by using, as a first reward of each paraphrased sentence generator, the similarity information and the probability that each of the plurality of paraphrased sentence generators generates the paraphrased sentence.

In this embodiment of this disclosure, the similarity information and the probability that each paraphrased sentence generator generates the paraphrased sentence are used as the reward to train the paraphrased sentence generator, so that the paraphrased sentence generator can ensure diversity of the paraphrased sentence while ensuring quality of the paraphrased sentence. Therefore, diversity of the paraphrased sentence and quality of the paraphrased sentence can be improved.

Optionally, the adjusting a parameter of each paraphrased sentence generator by using, as a first reward of each paraphrased sentence generator, the similarity information and the probability that each of the plurality of paraphrased sentence generators generates the paraphrased sentence may include:

adjusting a parameter of a first paraphrased sentence generator, so that a second reward of the first paraphrased sentence generator is greater than a first reward of the first paraphrased sentence generator, where the second reward of the first paraphrased sentence generator is obtained based on a paraphrased sentence generated through paraphrasing by the first paraphrased sentence generator whose parameter is adjusted, and the first paraphrased sentence generator is a paraphrased sentence generator having a highest probability of generating the paraphrased sentence in the plurality of paraphrased sentence generators; and adjusting a parameter of a paraphrased sentence generator other than the first paraphrased sentence generator in the plurality of paraphrased sentence generators, so that a second reward of the another paraphrased sentence generator is less than a first reward of the another paraphrased sentence generator, where the second reward of the another paraphrased sentence generator is obtained based on the paraphrased sentence generated through paraphrasing by the first paraphrased sentence generator whose parameter is adjusted.

For ease of understanding and description, the following example is used for description: The sentence paraphrase model includes three paraphrased sentence generators (for example, the three paraphrased sentence generators may be respectively numbered #1, #2, and #3), and each time one of the three paraphrased sentence generators paraphrases the training sentence to generate one paraphrased sentence.

For example, the paraphrased sentence generator #2 (namely, the first paraphrased sentence generator) may paraphrase the training sentence to generate a paraphrased sentence. In this case, source information (namely, a probability that each paraphrased sentence generator generates the paraphrased sentence) and similarity information may be determined based on the paraphrased sentence, and rewards of the three paraphrased sentence generators are determined based on the source information and the similarity information. Then, a parameter of the paraphrased sentence generator #2 (namely, the first paraphrased sentence generator) is adjusted in a direction in which a (subsequently) obtained reward increases, and a parameter of another paraphrased sentence generator (namely, the paraphrased sentence generators #1 and #3) is adjusted in a direction in which a (subsequently) obtained reward decreases.

For another example, after parameters of the three paraphrased sentence generators are adjusted, another training sentence may continue to be input for training (train the three paraphrased sentence generators). In this case, the paraphrased sentence generator #3 (namely, the first paraphrased sentence generator) may paraphrase the training sentence to generate a paraphrased sentence. Correspondingly, source information (namely, a probability that each paraphrased sentence generator generates the paraphrased sentence) and similarity information may be determined based on the paraphrased sentence, and rewards of the three paraphrased sentence generators are determined based on the source information and the similarity information. Then, a parameter of the paraphrased sentence generator #3 (namely, the first paraphrased sentence generator) is adjusted in a direction in which a (subsequently) obtained reward increases, and a parameter of another paraphrased sentence generator (namely, the paraphrased sentence generators #1 and #2) is adjusted in a direction in which a (subsequently) obtained reward decreases.

It may be learned that first paraphrased sentence generators in all times of training may be different (the first paraphrased sentence generator in each time is a paraphrased sentence generator that paraphrases the training sentence to generate the paraphrased sentence). Then, during parameter adjustment, the parameter of the first paraphrased sentence generator is adjusted in the direction in which the (subsequently) obtained reward increases, and the parameter of the another paraphrased sentence generator (the paraphrased sentence generator other than the first paraphrased sentence generator in the sentence paraphrase model) is adjusted in the direction in which the (subsequently) obtained reward decreases.

It should be noted that, "the parameter of the first paraphrased sentence generator is adjusted in the direction in which the (subsequently) obtained reward increases" may be understood as follows: A purpose of parameter adjustment is to enable the parameter of the first paraphrased sentence generator changes in a tendency in which the (obtained) reward increases.

Correspondingly, "the parameter of the another paraphrased sentence generator is adjusted in the direction in which the (subsequently) obtained reward decreases" may be understood as follows: A purpose of parameter adjustment is to enable the parameter of the another paraphrased sentence generator changes in a tendency in which the (obtained) reward decreases.

Optionally, after the plurality of paraphrased sentence generators obtain respective rewards, the parameter of each paraphrased sentence generator may be adjusted based on the following loss function.

For example, for the input sentence X, the paraphrased sentence generator $G_j$ generates the paraphrased sentence Y. In this case, a reward obtained by the paraphrased sentence generator $G_j$ may be jointly provided by the source discriminator and the similarity discriminator, and is as follows:

$$r_j(Y) = f(X, Y)$$

Correspondingly, a loss function $L(\theta)$ of the paraphrased sentence generator $G_j$ may be as follows:

$$L(\theta) - \log P(Y \mid X, r_j; \theta) = \sum_{t=1}^{T} \log p(y_t \mid y_1, \ldots, y_{t-1}, X, r_j; \theta),$$

where $\theta$ is a to-be-learned parameter in the paraphrased sentence generator $G_j$, $r_j$ is the reward obtained by the paraphrased sentence generator $G_j$, $y_1, \ldots, y_{t-1}$ are words in the paraphrased sentence Y, and t, T, and j are all positive integers.

Based on a policy gradient algorithm (REINFORCE algorithm), a derivative $\square_\theta L(\theta)$ of the foregoing loss function may be as follows:

$$\nabla_\theta L(\theta) = \sum_{t=1}^{T} \nabla_\theta \log p(y_t \mid y_1, \ldots, y_{t-1}, X, r_j; \theta) \cdot r_j(Y) =$$

$$\sum_{t=1}^{T} \nabla_\theta \log p(y_t \mid y_1, \ldots, y_{t-1}, X, r_j; \theta) \cdot f(X, Y)$$

In the method for training a sentence paraphrase model provided in this embodiment of this disclosure, the one or more of the plurality of paraphrased sentence generators are trained by using the source information and the similarity information as the reward, the source information is used to indicate the probability that each paraphrased sentence generator generates the paraphrased sentence of the training sentence, and the similarity information is used to indicate the similarity between the paraphrased sentence and the training sentence. In the sentence paraphrase model trained by using the method, both quality of the paraphrased sentence and diversity of the paraphrased sentence may be considered. Therefore, diversity of the paraphrased sentence generated by the sentence paraphrase model and quality of the paraphrased sentence can be improved.

Figure 12:
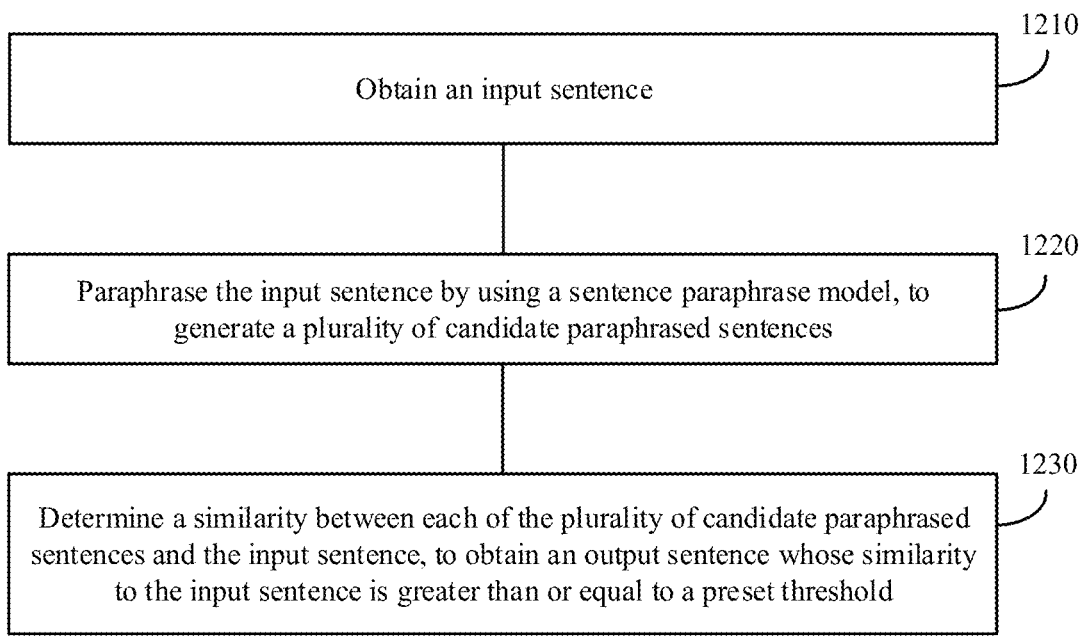
FIG. 12 is a schematic flowchart of a sentence paraphrase method according to an embodiment of this disclosure.

FIG. 12 is a schematic flowchart of a sentence paraphrase method 1200 according to an embodiment of this disclosure. The method shown in FIG. 12 may be performed by the terminal device in FIG. 7. The method shown in FIG. 12 includes step 1210, step 1220, and step 1230. The following separately describes the steps in detail.

S1210. Obtain an input sentence.

The input sentence may be a word, a phrase, or a sentence. In addition, the inputsentence may also be in various languages. This is not limited in this embodiment of this disclosure.

S1220. Paraphrase the input sentence by using a sentence paraphrase model, to generate a plurality of candidate paraphrased sentences.

The paraphrased sentence may be a word, a phrase, or a sentence. In addition, the paraphrased sentence may also be in various languages. This is not limited in this embodiment of this disclosure.

Optionally, the sentence paraphrase model may include a plurality of preset paraphrased sentence generators, each of the plurality of paraphrased sentence generators includes one neural network, one or more of the plurality of paraphrased sentence generators are trained by using a reinforcement learning method and by using source information and similarity information as a first reward, the source information is used to indicate a probability that each of the plurality of paraphrased sentence generators generates a paraphrased sentence of a training sentence, the similarity information is used to indicate a similarity between the paraphrased sentence and the training sentence, and the paraphrased sentence is obtained by paraphrasing the training sentence by using the plurality of paraphrased sentence generators.

The sentence paraphrase model in this embodiment of this disclosure includes a plurality of paraphrased sentence generators, and each paraphrased sentence generator thereof may generate a high-quality paraphrased sentence. Therefore, the plurality of paraphrased sentence generators in the sentence paraphrase model may be flexibly applied to fields such as machine translation, automatic question answering system, and information retrieval.

The plurality of paraphrased sentence generators may be further pre-trained first. A specific pre-training process is similar to that in the embodiment in FIG. 8, and details are not described herein again.

The sentence paraphrase model in FIG. 12 may be trained by using the method for training a sentence paraphrase model shown in FIG. 8.

S1230. Determine a similarity between each of the plurality of candidate paraphrased sentences and the input sentence, to obtain an output sentence whose similarity to the input sentence is greater than or equal to a preset threshold.

Optionally, each of the plurality of paraphrased sentence generators may be trained by using, as the first reward, the similarity information and the probability that each paraphrased sentence generator generates the paraphrased sentence.

In this embodiment of this disclosure, the similarity information and the probability that each paraphrased sentence generator generates the paraphrased sentence are used as the reward to train the paraphrased sentence generator, so that the paraphrased sentence generator can ensure diversity of the paraphrased sentence while ensuring quality of the paraphrased sentence. Therefore, diversity of the paraphrased sentence and quality of the paraphrased sentence can be improved.

Optionally, for a first paraphrased sentence generator, a second reward of the first paraphrased sentence generator is greater than a first reward of the first paraphrased sentence generator, where the second reward of the first paraphrased sentence generator is obtained based on a paraphrased sentence generated through paraphrasing by the first paraphrased sentence generator whose parameter is adjusted, the first paraphrased sentence generator is a paraphrased sentence generator having a highest probability of generating the paraphrased sentence in the plurality of paraphrased sentence generators, and the parameter of the first paraphrased sentence generator is adjusted based on the first reward of the first paraphrased sentence generator.

For a paraphrased sentence generator other than the first paraphrased sentence generator in the plurality of paraphrased sentence generators, a second reward of the another paraphrased sentence generator is less than a first reward of the another paraphrased sentence generator, where the second reward of the another paraphrased sentence generator is obtained based on the paraphrased sentence generated through paraphrasing by the first paraphrased sentence generator whose parameter is adjusted, and a parameter of the another paraphrased sentence generator is adjusted based on the first reward of the another paraphrased sentence generator.

Optionally, the sentence paraphrase model may further include a preset similarity discriminator, the similarity discriminator includes a second neural network, and the similarity information is determined by using the similarity discriminator.

The similarity discriminator may be further pre-trained first. A specific pre-training process is similar to that in the embodiment in FIG. 8, and details are not described herein again.

In this embodiment of this disclosure, the similarity discriminator (including the second neural network) is used to determine the similarity information, so that accuracy of the similarity information can be improved.

Optionally, the source information may be determined by using a preset source discriminator, and the source discriminator includes a third neural network.

The source discriminator may be further pre-trained first. A specific pre-training process is similar to that in the embodiment in FIG. 8, and details are not described herein again. In this embodiment of this disclosure, the source discriminator (including the third neural network) is used to determine the source information, so that accuracy of the source information can be improved.

Optionally, in a process of training the paraphrased sentence generator, a number of a paraphrased sentence generator that generates the paraphrased sentence may be used as a label of the paraphrased sentence, to train the source discriminator.

It may be learned that a training process of the source discriminator is supervised training.

In this embodiment of this disclosure, the one or more of the plurality of paraphrased sentence generators are trained by using the source information and the similarity information as the reward, the source information is used to indicate the probability that each paraphrased sentence generator generates the paraphrased sentence of the training sentence, and the similarity information is used to indicate the similarity between the paraphrased sentence and the training sentence. In the sentence paraphrase model trained by using the method, both quality of the paraphrased sentence and diversity of the paraphrased sentence may be considered. Therefore, diversity of the paraphrased sentence and quality of the paraphrased sentence can be improved.

Figure 13:
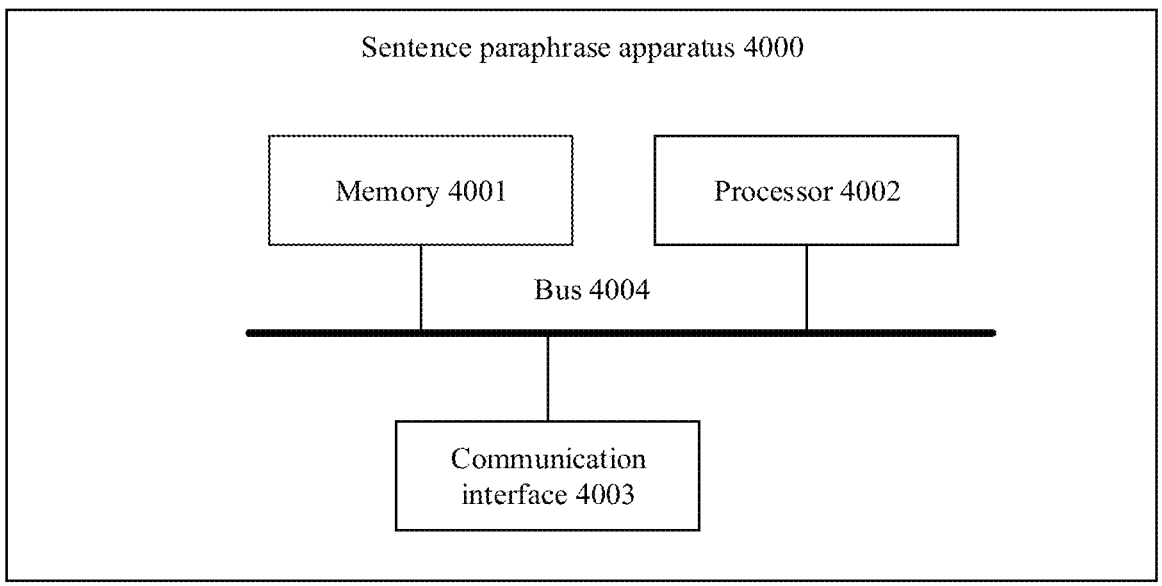
FIG. 13 is a schematic diagram of a hardware structure of a sentence paraphrase apparatus according to an embodiment of this disclosure.

FIG. 13 is a schematic diagram of a hardware structure of a sentence paraphrase apparatus according to an embodiment of this disclosure. A sentence paraphrase apparatus 4000 shown in FIG. 13 includes a memory 4001, a processor 4002, a communication interface 4003, and a bus 4004. Communication connections between the memory 4001, the processor 4002, and the communication interface 4003 are implemented through the bus 4004.

It should be understood that the apparatus shown in FIG. 13 is merely an example and imposes no limitation, and the sentence paraphrase apparatus 4000 may include more or fewer modules or units. This is not limited in this embodiment of this disclosure.

The memory 4001 may be a read-only memory (ROM), a static storage device, a dynamic storage device, or a random access memory (RAM). The memory 4001 may store a program. When executing the program stored in the memory 4001, the processor 4002 and the communication interface 4003 are configured to perform steps of the sentence paraphrase method in the embodiments of this disclosure.

The processor 4002 may be a general-purpose central processing unit (CPU), a microprocessor, an application-specific integrated circuit (ASIC), a graphics processing unit (GPU), or one or more integrated circuits, and is configured to execute a related program, so as to implement a function that needs to be performed by a unit of the sentence paraphrase apparatus in the embodiments of this disclosure, or perform the sentence paraphrase method in the method embodiments of this disclosure.

The processor 4002 may alternatively be an integrated circuit chip and has a signal processing capability. In an implementation process, the steps of the sentence paraphrase method in the embodiments of this disclosure may be completed by using a hardware integrated logic circuit or an instruction in a form of software in the processor 4002.

The foregoing processor 4002 may be further a general-purpose processor, a digital signal processor (DSP), an ASIC, a field programmable gate array (FPGA) or another programmable logic device, a discrete gate or transistor logic device, or a discrete hardware component. The foregoing general-purpose processor may be a microprocessor, any conventional processor, or the like. The steps of the methods disclosed with reference to the embodiments of this disclosure may be directly performed and completed by a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 4001. The processor 4002 reads information in the memory 4001, and completes, in combination with hardware of the processor 4002, a function that needs to be executed by a unit included in the sentence paraphrase apparatus in this embodiment of this disclosure, or performs the sentence paraphrase method in the method embodiments of this disclosure.

The communication interface 4003 uses a transceiver apparatus, for example, but not limited to, a transceiver, to implement communication between the apparatus 4000 and another device or a communication network. For example, an input sentence may be obtained through the communication interface 4003.

The bus 4004 may include a path for information transfer between various components (for example, the memory 4001, the processor 4002, and the communication interface 4003) of the apparatus 4000.

Figure 14:
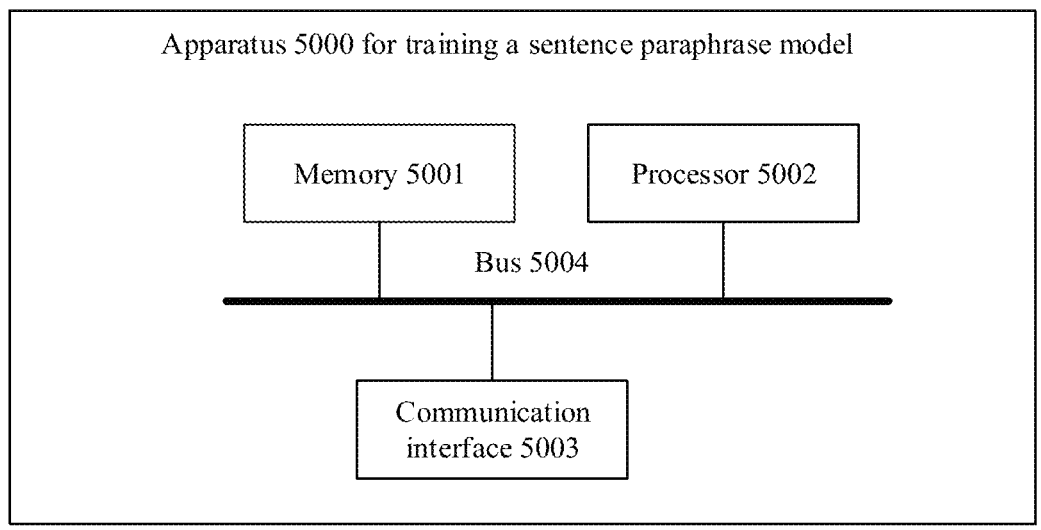
FIG. 14 is a schematic diagram of a hardware structure of an apparatus for training a sentence paraphrase model according to an embodiment of this disclosure.

FIG. 14 is a schematic diagram of a hardware structure of an apparatus 5000 for training a sentence paraphrase model according to an embodiment of this disclosure. Similar to the foregoing apparatus 4000, the apparatus 5000 for training a sentence paraphrase model shown in FIG. 14 includes a memory 5001, a processor 5002, a communication interface 5003, and a bus 5004. Communication connections between the memory 5001, the processor 5002, and the communication interface 5003 are implemented through the bus 5004.

It should be understood that the apparatus shown in FIG. 14 is merely an example and imposes no limitation, and the apparatus 5000 for training a sentence paraphrase model may include more or fewer modules or units. This is not limited in this embodiment of this disclosure.

The memory 5001 may store a program. When the program stored in the memory 5001 is executed by the processor 5002, the processor 5002 is configured to perform steps of the method for training a sentence paraphrase model in the embodiments of this disclosure.

The processor 5002 may be a general-purpose CPU, a microprocessor, an ASIC, a GPU, or one or more integrated circuits, and is configured to perform a related program, to implement the method for training a sentence paraphrase model provided in the embodiments of this disclosure.

The processor 5002 may alternatively be an integrated circuit chip and has a signal processing capability. In an implementation process, steps of the method for training the sentence paraphrase model in the embodiments of this disclosure can be implemented by using a hardware integrated logic circuit or an instruction in a form of software in the processor 5002.

It should be understood that, the apparatus 5000 for training a sentence paraphrase model shown in FIG. 14 trains a sentence paraphrase model, and the trained sentence paraphrase model may be used to perform the sentence paraphrase method in the embodiments of this disclosure. Specifically, the sentence paraphrase model in the method shown in FIG. 12 can be obtained by training the sentence paraphrase model by using the apparatus 5000.

Specifically, the apparatus shown in FIG. 14 may obtain training data and a to-be-trained sentence paraphrase model from outside through the communication interface 5003. Then, the processor trains the to-be-trained sentence paraphrase model based on the training data.

It should be noted that, although only the memory, the processor, and the communication interface are shown in each of the apparatus 4000 and the apparatus 5000, in a specific implementation process, a person skilled in the art should understand that the apparatus 4000 and the apparatus 5000 each may further include another component necessary for normal running.

In addition, according to a specific requirement, a person skilled in the art should understand that the apparatus 4000 and the apparatus 5000 may further include hardware components for implementing other additional functions. In addition, a person skilled in the art should understand that the apparatus 4000 and the apparatus 5000 may include only components necessary for implementing the embodiments of this disclosure, but not necessarily include all the components shown in FIG. 13 and FIG. 14.

It should be understood that, the processor in the embodiments of this disclosure may be a central processing unit (CPU). The processor may be further another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, any conventional processor, or the like.

It may be further understood that the memory in the embodiments of this disclosure may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external buffer. Through an example rather than limitative description, random access memories (RAM) in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

All or some of the foregoing embodiments may be implemented by software, hardware, firmware, or any combination thereof. When software is used to implement the embodiments, all or some of the foregoing embodiments may be implemented in a form of a computer program product. The computer program product includes one or more computer instructions or computer programs. When the computer instructions or the computer programs are loaded and executed on a computer, the procedure or functions according to the embodiments of this disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects and represents that three relationships may exist. For example, A and/or B may represent the following three cases: only A exists, both A and B exist, and only B exists. A and B may be singular or plural. In addition, the character "/" in this specification usually represents an "or" relationship between the associated objects, or may represent an "and/or" relationship. A specific meaning depends on a context.

In this disclosure, "at least one" means one or more, and "a plurality of" means two or more. "At least one of the following items (pieces)" or a similar expression thereof means any combination of the items, including any combination of one item (piece) or a plurality of items (pieces). For example, at least one of a, b, or c may indicate a, b, c, a-b, a-c, b-c, or a-b-c, where a, b, and c each may be singular or plural.

It should be understood that, in the embodiments of this disclosure, sequence numbers of the foregoing processes do not mean execution sequences. The execution sequences of the processes should be determined based on functions and internal logic of the processes, and should not constitute any limitation to implementation processes of the embodiments of this disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this disclosure, it should be understood that the disclosed system, apparatus, and method may be implemented in another manner. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this disclosure may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this disclosure essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this disclosure. The foregoing storage medium includes various media that can store program code, such as a USB flash drive, a removable hard disk, a read-only memory (ROM), a random access memory (RAM), a magnetic disk, and an optical disc.

The foregoing description is merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A sentence paraphrase method performed by a processor, comprising:
   paraphrasing an input sentence by using a sentence paraphrase model, to generate a plurality of candidate paraphrased sentences; and
   determining a similarity between each of the plurality of candidate paraphrased sentences and the input sentence;
   determining an output sentence, among the plurality of candidate paraphrased sentences, whose similarity to the input sentence is greater than or equal to a preset threshold, wherein
   the sentence paraphrase model comprises a plurality of preset paraphrased sentence generators, each of the plurality of paraphrased sentence generators comprises one neural network, one or more of the plurality of paraphrased sentence generators trained by using a reinforcement learning method and by using source information and similarity information as a first reward, wherein:
      the source information indicates an estimated probability for each of the plurality of paraphrased sentence generators that the respective paraphrased sentence generator generated a paraphrased sentence of a training sentence,
      the similarity information indicates a similarity between the paraphrased sentence and the training sentence, and
      the paraphrased sentence is obtained by paraphrasing the training sentence using the respective paraphrased sentence generator.

2. The method according to claim 1, wherein each of the plurality of paraphrased sentence generators is trained by using, as the first reward, the similarity information and the estimated probability that each paraphrased sentence generator generated the paraphrased sentence.

3. The method according to claim 2, wherein
   for a first paraphrased sentence generator, a second reward of the first paraphrased sentence generator is greater than a first reward of the first paraphrased sentence generator, wherein the second reward of the first paraphrased sentence generator is obtained based on a paraphrased sentence generated through paraphrasing by the first paraphrased sentence generator whose parameter is adjusted, the first paraphrased sentence generator is a paraphrased sentence generator in the plurality of paraphrased sentence generators having a highest estimated probability of having generated the paraphrased sentence, and the parameter of the first paraphrased sentence generator is adjusted based on the first reward of the first paraphrased sentence generator; and
   for a paraphrased sentence generator other than the first paraphrased sentence generator in the plurality of paraphrased sentence generators, a second reward of the another paraphrased sentence generator is less than a first reward of the another paraphrased sentence generator, wherein the second reward of the another paraphrased sentence generator is obtained based on the paraphrased sentence generated through paraphrasing by the first paraphrased sentence generator whose parameter is adjusted, and the parameter of the another paraphrased sentence generator is adjusted based on the first reward of the another paraphrased sentence generator.

4. The method according to claim 1, wherein the sentence paraphrase model further comprises a preset similarity discriminator, the similarity discriminator comprises a second neural network, and the similarity information is determined by using the similarity discriminator.

5. The method according to claim 1, wherein the source information is determined by using a preset source discriminator, and the source discriminator comprises a third neural network.

6. A method performed by a processor for training a sentence paraphrase model, wherein the sentence paraphrase model comprises a plurality of preset paraphrased sentence generators, each of the plurality of paraphrased sentence generators comprises one neural network, and the method comprises:
  paraphrasing a training sentence by using a first paraphrased sentence generator, to generate a paraphrased sentence, the first paraphrased sentence generator is one of the plurality of paraphrased sentence generators;
  determining source information of the paraphrased sentence, wherein the source information indicates an estimated probability, for each of the plurality of paraphrased sentence generators, that the respective paraphrased sentence generator generated the paraphrased sentence;
  determining similarity information between the paraphrased sentence and the training sentence, wherein the similarity information indicates a similarity between the paraphrased sentence and the training sentence; and
  adjusting parameters of one or more of the plurality of paraphrased sentence generator by using a reinforcement learning method and by using the source information and the similarity information as a first reward.

7. The method according to claim 6, wherein the adjusting parameters of one or more of the plurality of paraphrased sentence generators by using the source information and the similarity information as the first reward comprises:
  adjusting a parameter of each paraphrased sentence generator by using, as the first reward of each paraphrased sentence generator, the similarity information and the estimated probability that each of the plurality of paraphrased sentence generators generates the chosen paraphrased sentence.

8. The method according to claim 7, wherein the adjusting the parameter of each paraphrased sentence generator by using, as the first reward of each paraphrased sentence generator, the similarity information and the estimated probability that each of the plurality of paraphrased sentence generators generates the paraphrased sentence comprises:
  adjusting a parameter of a first paraphrased sentence generator, so that a second reward of the first paraphrased sentence generator is greater than a first reward of the first paraphrased sentence generator, wherein the second reward of the first paraphrased sentence generator is obtained based on a paraphrased sentence generated through paraphrasing by the first paraphrased sentence generator whose parameter is adjusted, and the first paraphrased sentence generator is a paraphrased sentence generator having a highest estimated probability of having generated the paraphrased sentence in the plurality of paraphrased sentence generators; and
  adjusting a parameter of a paraphrased sentence generator other than the first paraphrased sentence generator in the plurality of paraphrased sentence generators, so that a second reward of the another paraphrased sentence generator is less than a first reward of the another paraphrased sentence generator, wherein the second reward of the another paraphrased sentence generator is obtained based on the paraphrased sentence generated through paraphrasing by the first paraphrased sentence generator whose parameter is adjusted.

9. The method according to claim 6, wherein the sentence paraphrase model further comprises a preset similarity discriminator, and the similarity discriminator comprises a second neural network; and
  the determining similarity information between the paraphrased sentence and the training sentence comprises:
  determining the similarity information between the paraphrased sentence and the training sentence by using the similarity discriminator.

10. The method according to claim 6, wherein the determining source information of the paraphrased sentence comprises:
  determining the source information of the paraphrased sentence by using a preset source discriminator, wherein the source discriminator comprises a third neural network.

11. A sentence paraphrase apparatus, comprising a processor and a memory, wherein the memory is configured to store program instructions, and the processor is configured to invoke the program instructions to perform:
  paraphrasing an input sentence by using a sentence paraphrase model, to generate a plurality of candidate paraphrased sentences; and
  determining a similarity between each of the plurality of candidate paraphrased sentences and the input sentence;
  determining an output sentence, among the plurality of candidate paraphrased sentences, whose similarity to the input sentence is greater than or equal to a preset threshold, wherein
  the sentence paraphrase model comprises a plurality of preset paraphrased sentence generators, each of the plurality of paraphrased sentence generators comprises one neural network, one or more of the plurality of paraphrased sentence generators are trained by using a reinforcement learning method and by using source information and similarity information as a first reward, wherein
  the source information is indicates an estimated probability for each of the plurality of paraphrased sentence generators that the respective paraphrased sentence generator generated a paraphrased sentence of a training sentence,
  the similarity information indicates a similarity between the paraphrased sentence and the training sentence, and
  the paraphrased sentence is obtained by paraphrasing the training sentence by using the plurality of paraphrased sentence generators.

12. The apparatus according to claim 11, wherein each of the plurality of paraphrased sentence generators is trained by using, as the first reward, the similarity information and the estimated probability that each paraphrased sentence generator generated the paraphrased sentence.

13. The apparatus according to claim 12, wherein
  for a first paraphrased sentence generator, a second reward of the first paraphrased sentence generator is greater than a first reward of the first paraphrased sentence generator, wherein the second reward of the first paraphrased sentence generator is obtained based on a paraphrased sentence generated through paraphrasing by the first paraphrased sentence generator whose parameter is adjusted, the first paraphrased sentence generator is a paraphrased sentence generator having a highest estimated probability of having generated the paraphrased sentence in the plurality of paraphrased sentence generators, and the parameter of the first paraphrased sentence generator is adjusted based on the first reward of the first paraphrased sentence generator; and for a paraphrased sentence generator other than the first paraphrased sentence generator in the plurality of paraphrased sentence generators, a second reward of the another paraphrased sentence generator is less than a first reward of the another paraphrased sentence generator, wherein the second reward of the another paraphrased sentence generator is obtained based on the paraphrased sentence generated through paraphrasing by the first paraphrased sentence generator whose parameter is adjusted, and a parameter of the another paraphrased sentence generator is adjusted based on the first reward of the another paraphrased sentence generator.

14. The apparatus according to claim 11, wherein the sentence paraphrase model further comprises a preset similarity discriminator, the similarity discriminator comprises a second neural network, and the similarity information is determined by using the similarity discriminator.

15. The apparatus according to claim 11, wherein the source information is determined by using a preset source discriminator, and the source discriminator comprises a third neural network.

16. A non-transitory computer-readable storage medium, wherein the non-transitory computer-readable medium stores program code to be executed by a device, and when the program code is executed by the device the devise is configured to perform:

paraphrasing an input sentence by using a sentence paraphrase model, to generate a plurality of candidate paraphrased sentences; and determining a similarity between each of the plurality of candidate paraphrased sentences and the input sentence;

determining an output sentence, among the plurality of candidate paraphrased sentences, whose similarity to the input sentence is greater than or equal to a preset threshold, wherein the sentence paraphrase model comprises a plurality of preset paraphrased sentence generators, each of the plurality of paraphrased sentence generators comprises one neural network, one or more of the plurality of paraphrased sentence generators are trained by using a reinforcement learning method and by using source information and similarity information as a first reward, wherein the source information is indicates an estimated probability for each of the plurality of paraphrased sentence generators that the respective paraphrased sentence generator generated a paraphrased sentence of a training sentence, the similarity information indicates a similarity between the paraphrased sentence and the training sentence, and the paraphrased sentence is obtained by paraphrasing the training sentence by using the plurality of paraphrased sentence generators.

17. The non-transitory computer-readable storage medium according to claim 16, wherein each of the plurality of paraphrased sentence generators is trained by using, as the first reward, the similarity information and the estimated probability that each paraphrased sentence generator generated the paraphrased sentence.

18. The non-transitory computer-readable storage medium according to claim 17, wherein for a first paraphrased sentence generator, a second reward of the first paraphrased sentence generator is greater than a first reward of the first paraphrased sentence generator, wherein the second reward of the first paraphrased sentence generator is obtained based on a paraphrased sentence generated through paraphrasing by the first paraphrased sentence generator whose parameter is adjusted, the first paraphrased sentence generator is a paraphrased sentence generator having a highest estimated probability of having generated the paraphrased sentence in the plurality of paraphrased sentence generators, and the parameter of the first paraphrased sentence generator is adjusted based on the first reward of the first paraphrased sentence generator; and for a paraphrased sentence generator other than the first paraphrased sentence generator in the plurality of paraphrased sentence generators, a second reward of the another paraphrased sentence generator is less than a first reward of the another paraphrased sentence generator, wherein the second reward of the another paraphrased sentence generator is obtained based on the paraphrased sentence generated through paraphrasing by the first paraphrased sentence generator whose parameter is adjusted, and a parameter of the another paraphrased sentence generator is adjusted based on the first reward of the another paraphrased sentence generator.

19. The non-transitory computer-readable storage medium according to claim 16, wherein the sentence paraphrase model further comprises a preset similarity discriminator, the similarity discriminator comprises a second neural network, and the similarity information is determined by using the similarity discriminator.

20. The non-transitory computer-readable storage medium according to claim 16, wherein the source information is determined by using a preset source discriminator, and the source discriminator comprises a third neural network.

* * * * *